(12) United States Patent
Miyasa et al.

(10) Patent No.: US 12,528,957 B2
(45) Date of Patent: *Jan. 20, 2026

(54) WHITE INK JET INK COMPOSITION AND INK JET RECORDING METHOD

(71) Applicant: Seiko Epson Corporation, Tokyo (JP)

(72) Inventors: Ryota Miyasa, Matsumoto (JP); Kazuto Aoki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 818 days.

This patent is subject to a terminal disclaimer.

(21) Appl. No.: 17/706,729

(22) Filed: Mar. 29, 2022

(65) Prior Publication Data

US 2022/0325119 A1 Oct. 13, 2022

(30) Foreign Application Priority Data

Mar. 30, 2021 (JP) ................. 2021-057423

(51) Int. Cl.
C09D 11/322 (2014.01)
B41J 2/21 (2006.01)
B41M 5/00 (2006.01)
C09D 11/033 (2014.01)
C09D 11/037 (2014.01)
(Continued)

(52) U.S. Cl.
CPC .......... C09D 11/322 (2013.01); B41J 2/2117 (2013.01); B41M 5/0023 (2013.01); C09D 11/033 (2013.01); C09D 11/037 (2013.01); C09D 11/102 (2013.01); C09D 11/107 (2013.01);
(Continued)

(58) Field of Classification Search
CPC ... C09D 11/322; C09D 11/033; C09D 11/037; C09D 11/102; C09D 11/107; C09D 11/38; C09D 11/30; B41J 2/2114; B41J 2/14233; B41J 2002/14241; B41J 2002/14419; B41J 2/2117; B41M 5/0023; D06P 1/525;
(Continued)

(56) References Cited

U.S. PATENT DOCUMENTS

2008/0139706 A1  6/2008 Kaji et al.
2016/0152845 A1  6/2016 Okada et al.
(Continued)

FOREIGN PATENT DOCUMENTS

CN   111379173 A      7/2020
JP   2001302949 A  * 10/2001
(Continued)

OTHER PUBLICATIONS

Shin-Etsu Chemical Co., Ltd., "Technical Data Sheet, KP-543," Oct. 19, 2012, pp. 1-2. (Year: 2012).*
(Continued)

Primary Examiner — Coris Fung
Assistant Examiner — Caroline D. Liott
(74) Attorney, Agent, or Firm — Harness, Dickey & Pierce, P.L.C.

(57) ABSTRACT

A white ink jet ink composition according to the present disclosure includes hollow resin particles, resin particles, and water. The hollow resin particles have a glass transition temperature of 120° C. or more, the resin particles are composed of an acrylic resin or a urethane resin, and the content of the resin particles is 5% by mass or more relative to the total mass of the ink composition.

12 Claims, 2 Drawing Sheets

(51) Int. Cl.
  *C09D 11/102* (2014.01)
  *C09D 11/107* (2014.01)
  *D06P 1/52* (2006.01)
  *D06P 5/00* (2006.01)
  *D06P 5/30* (2006.01)

(52) U.S. Cl.
  CPC ............ *D06P 1/525* (2013.01); *D06P 1/5285* (2013.01); *D06P 5/002* (2013.01); *D06P 5/30* (2013.01)

(58) Field of Classification Search
  CPC ...... D06P 1/5285; D06P 1/5257; D06P 5/002; D06P 5/30; D06P 5/225
  See application file for complete search history.

(56) References Cited

U.S. PATENT DOCUMENTS

| | | |
|---|---|---|
| 2017/0283637 A1 | 10/2017 | Sakai |
| 2018/0094150 A1 | 4/2018 | Katsuragi |
| 2019/0284412 A1 | 9/2019 | Maekawa et al. |
| 2019/0301086 A1* | 10/2019 | Naruse .................. C09D 11/54 |
| 2020/0002561 A1 | 1/2020 | Hayashi et al. |
| 2020/0023648 A1 | 1/2020 | Gotou et al. |
| 2020/0207136 A1 | 7/2020 | Miyasa et al. |
| 2020/0276850 A1* | 9/2020 | Urano .................... B41J 2/2114 |
| 2021/0009834 A1* | 1/2021 | Kawai ................. C09D 11/037 |
| 2021/0129568 A1 | 5/2021 | Miyasa et al. |
| 2022/0017760 A1 | 1/2022 | Ikai et al. |

FOREIGN PATENT DOCUMENTS

| | | |
|---|---|---|
| JP | 2017-179263 A | 10/2017 |
| JP | 2018-059053 A | 4/2018 |
| JP | 2019-123841 A | 7/2019 |
| JP | 2020-007396 A | 1/2020 |
| JP | 2020-007543 A | 1/2020 |

OTHER PUBLICATIONS

Nippon Shokubai Co. Ltd., "Epocros," Oct. 2016, pp. 1-14. (Year: 2016).*

Partial English translation of Jp 2020-007396A, Jan. 16, 2020, Table 1-4. (Year: 2024).*

Machine English translation of Yamamoto Yoshinori, JP-2001302949-A, Oct. 31, 2001. (Year: 2001).*

* cited by examiner

WHITE INK JET INK COMPOSITION AND INK JET RECORDING METHOD The present application is based on, and claims priority from JP Application Serial Number 2021-057423, filed Mar. 30, 2021, the disclosure of which is hereby incorporated by reference herein in its entirety.

BACKGROUND

1. Technical Field

The present disclosure relates to a white ink jet ink composition and an ink jet recording method.

2. Related Art

In order to allow a recorded matter to obtain good color development even on a colored recording medium by ink jet recording, a white ink jet ink composition (also referred to as a "white ink" or a "white ink composition", and may be simply referred to as an "ink" or an "ink composition" hereinafter) may be coated as an under layer below an image with a color ink.

A titanium oxide pigment has been used as a white coloring material contained in a white ink, but such a pigment has poor sedimentation property (being easily sedimented with time) due to the high specific gravity and thus causes the need to provide a mechanism which circulates the white ink in a recording apparatus. However, the use of such a mechanism has the problem of increasing the size of the recording apparatus.

Whereas known is a white ink jet ink composition not using titanium oxide pigment which is easily sedimented, but using hollow resin particles as a white coloring material (for example, JP-A-2017-179263).

However, color development may be unsatisfactory according to the hollow resin particles used. In addition, in some cases, the hollow resin particles permeate into a recording medium and thus satisfactory color development cannot be obtained. In particular, this becomes remarkable when the recording medium is a fabric. Therefore, a white ink jet ink composition having the excellent sedimentation property and color development is required.

SUMMARY

According to an aspect of the present disclosure, a white ink jet ink composition includes hollow resin particles, resin particles, and water. The hollow resin particles have a glass transition temperature of 120° C. or more, the resin particles are composed of an acrylic resin or a urethane resin, and the content of the resin particles is 5% by mass or more relative to the total mass of the ink composition.

According to an aspect of the present disclosure, an ink jet recording method includes a white ink adhering step of ejecting the white ink jet ink composition according to the aspect described above from a recording head and adhering the ink composition to a recording medium.

DESCRIPTION OF EXEMPLARY EMBODIMENTS

Figure 1:
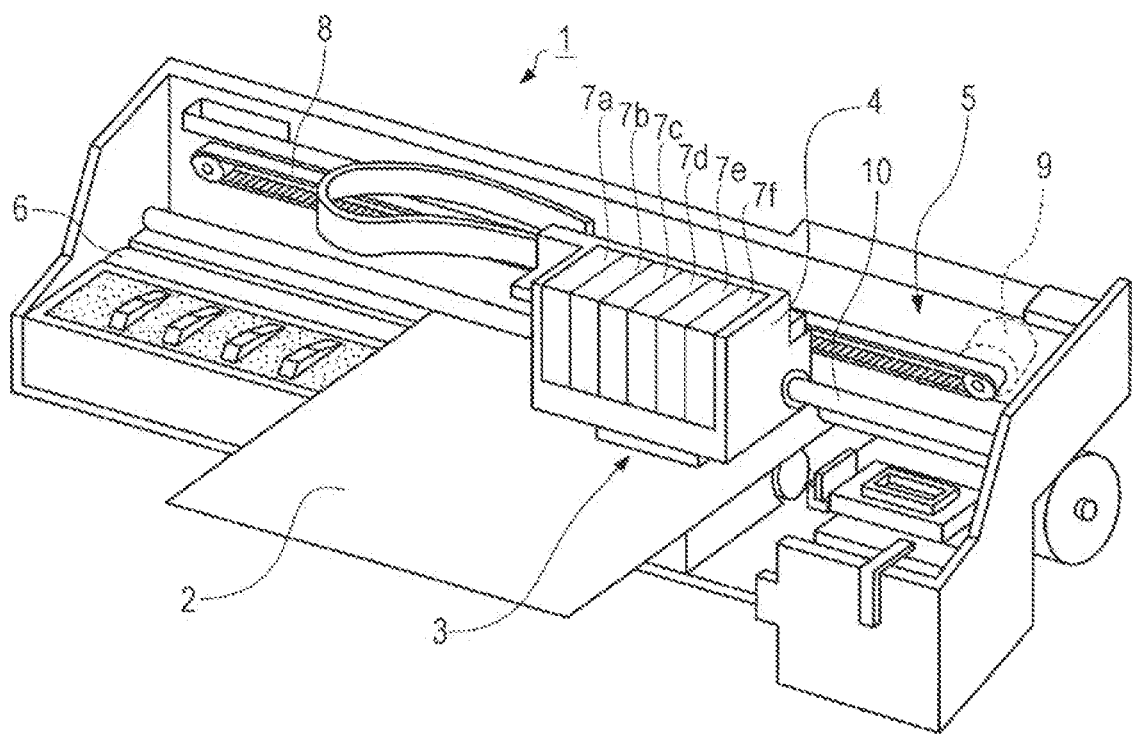
FIG. 1 is a schematic perspective view of an ink jet recording apparatus which can be applied to a white ink jet ink composition according to an embodiment of the present disclosure.

An embodiment of the present disclosure is described below. The embodiment described below is an example of the present disclosure. The present disclosure is not limited to the example and includes various modified embodiments carried out within a range not changing the gist of the present disclosure. Not all the configurations described below are necessarily essential configurations of the present disclosure.

1. White Ink Jet Ink Composition

A white ink jet ink composition according to an embodiment of the present disclosure includes hollow resin particles, resin particles, and water. The hollow resin particles have a glass transition temperature of 120° C. or more, the resin particles are composed of an acrylic resin or a urethane resin, and the content of the resin particles is 5% by mass or more relative to the total mass of the ink composition.

The white ink jet ink composition according to the present embodiment uses the hollow resin particles as a white coloring material, not a titanium oxide pigment which is easily sedimented with time due to the high specific gravity, and thus the sedimentation of the white coloring material can be satisfactorily suppressed. On the other hand, when the hollow resin particles are used as the white coloring material for an ink, the hollow structure may be broken by melting or the like of the resin when a recording medium is heat-dried after printing, easily resulting in a decrease in color development. Therefore, a decrease in color development can be suppressed by using the hollow resin particles having a glass transition temperature equal to or higher than a specific temperature. However, even when the specific hollow resin particles are used, the hollow resin particles may permeate into the recording medium, thereby causing unsatisfactory color development.

While the white ink jet ink composition according to the present embodiment has a configuration further using the specific resin particles at a predetermined content or more. This can achieve a mesh sealing effect on the recording medium, that is, the effect of suppressing the permeation of the hollow resin particles into the recording medium, and thus can improve color development. As described above, the white ink jet ink composition according to the present embodiment contains the hollow resin particles, having a glass transition temperature equal to or higher than the specific temperature, and a predetermined amount or more of the specific resin particles, and thus both the color development and sedimentation property can be improved.

Each of the components contained in the white ink jet ink composition according to the present embodiment is described below.

1. 1. Hollow Resin Particles

The white ink jet ink composition according to the present embodiment contains the hollow resin particles, the hollow resin particles having a glass transition temperature of 120° C. or more.

Particle Structure

In the present disclosure, the "hollow resin particles" represents resin particles in a state where the resin particles have gaps therein and the gaps are filled with a liquid or gas. In a method for determining to be hollow, when particles have a structure in which gaps are recognized in the particles by observing particle sections with a scanning electron microscope, the particles are determined as hollow resin particles. In another method for determining to be hollow, when particles have a structure in which a difference in contrast of transmitted electrons is recognized by observing the particles with a transmission electron microscope, the particles are determined as hollow resin particles. When resin particles have gaps therein in observation with a transmission electron microscope, the internal gaps are observed with a bright contrast because electron beams are transmitted through the internal gaps, and thus the presence of the internal gaps can be determined by the presence of a difference in contrast of transmitted electrons.

The hollow resin particles have outer shells preferably formed of a liquid permeable resin. In this configuration, the internal gaps of the hollow resin particles in the ink composition are filled with an aqueous medium. The particles filled with the aqueous medium have a specific gravity substantially equal to that of the outside aqueous medium, and thus the particles can maintain dispersion stability without sedimentation in the white ink composition. Therefore, storage stability and ejection reliability of the white ink composition can be enhanced.

Also, when the white ink jet ink composition according to the present embodiment is ejected on paper or another recording medium, the particles become hollow due to release of the aqueous medium in the particles during drying. When the particles contain air therein, the particles form a resin layer and an air layer having different refractive indexes, and thus incident light can be effectively scattered, thereby exhibiting white color.

Resin

Examples of the resin of the hollow resin particles include known resins such as a urethane-based resin, an acrylic resin, a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene-vinyl acetate-based resin, and the like. These resins can be used alone or in combination of two or more.

Among these resins, the hollow resin particles used in the present disclosure preferably contain an acrylic resin. When the hollow resin particles contain an acrylic resin and the resin particles (described later) contained in the white ink composition are composed of the acrylic resin, the resins are the same type of resins, and thus adhesion at the interfaces between the hollow resin particles and the resin particles can be improved, thereby improving abrasion resistance.

The acrylic resin is a generic name of polymers produced by polymerizing as one component at least an acrylic monomer such as acrylic acid, methacrylic acid, acrylate ester, methacrylate ester, or the like, and examples thereof include a resin obtained from an acrylic monomer, a copolymer of an acrylic monomer and another monomer, and the like. For example, an acrylic-vinyl resin which is a copolymer of an acrylic monomer and a vinyl monomer can be used. Further, a copolymer with a vinyl monomer such as styrene or the like can be used.

When a resin which is an acrylic resin and also corresponds to another type of resin is discriminated to be either the acrylic resin or the other type of resin, the resin having 50% by mass or more of a structure derived from the acrylic monomer is regarded as the acrylic resin.

Usable examples of the acrylic monomer include acryl amide, acrylonitrile, and the like. In the present specification, the acrylic resin may be a styrene-acrylic resin described later.

The styrene-acrylic resin is a copolymer obtained from a styrene monomer and an acrylic monomer, and examples thereof include styrene-acrylic acid copolymer, styrene-methacrylic acid copolymer, styrene-methacrylic acid-acrylate ester copolymer, styrene-α-methylstyrene-acrylic acid copolymer, styrene-α-methylstyrene-acrylic acid-acrylate ester copolymer, and the like. As described above, the styrene-acrylic resin is considered to be included in the acrylic resin.

Physical Properties Etc.

The hollow resin particles contained in the white ink jet ink composition according to the present embodiment have a glass transition temperature of 120° C. or more. The glass transition temperature of the hollow resin particles may be 125° C. or more, 130° C. or more, 140° C. or more, or 150° C. or more, but is more preferably equal to or higher than the surface temperature of the recording medium heated in a heat drying step of an ink jet recording method described later. On the other hand, the upper limit value of the glass transition temperature of the hollow resin particles is not particularly limited, but is preferably 180° C. or less, more preferably 170° C. or less, still more preferably 160° C. or less, and particularly preferably 150° C. or less.

When the glass transition temperature of the hollow resin particles is within the range described above, a decrease in color development can be suppressed. In order to achieve good abrasion resistance, the white ink composition is required to be heat-dried after being adhered to the recording medium. However, in this case, the hollow structure may be broken due to melting or the like of the hollow resin particles by heating. The particles having the broken hollow structure cannot effectively scatter incident light, and thus color development (whiteness) is decreased. However, the hollow resin particles of the present disclosure have a glass transition temperature within the range described above, and thus even when heated to a heating temperature easily causing good abrasion resistance, the breakage of the hollow structure of the hollow resin particles can be suppressed. Consequently, a decrease in color development can be suppressed.

When the hollow resin particles are produced by polymerization, the glass transition temperature of the hollow resin particles can be changed by changing at least one of the type and component ratio of the vinyl monomer used, the polymerization conditions, and resin denaturation. The polymerization conditions include the polymerization temperature, the type of the medium in which the vinyl monomer is contained, the vinyl monomer concentration in the medium, the types and amounts of the polymerization initiator and catalyst used in polymerization, etc. The glass transition temperature can be measured by a differential scanning calorimetry (DSC method) based on JIS K7121.

The particle diameter (outer diameter) of the hollow resin particles is preferably 400 to 1000 nm. Also, the particle diameter of the hollow resin particles is preferably 450 nm or more and more preferably 475 nm or more. On the other hand, the particle diameter of the hollow resin particles is preferably 800 nm or less and more preferably 600 nm or less. With the outer diameter exceeding 1000 nm, dispersion stability may deteriorate due to sedimentation of the particles, and reliability such as clogging of an ink jet recording head may be degraded. While with the outer diameter of less than 400 nm, whiteness tends to become insufficient. That is, when the particle diameter (outer diameter) of the hollow resin particles is within the range described above, both the good sedimentation property (the particles are hardly sedimented) and good color development can be satisfied. In addition, the inner diameter of the hollow resin particles is properly about 100 to 800 nm.

When the particle diameter (outer diameter) of the hollow resin particles is within the range described above, the amount of the hollow resin particles required for color development can be decreased. Thus, the amount of the resin particles relative to the hollow resin particles can be increased, and permeation of the hollow resin particles into the recording medium can be more easily suppressed, thereby causing a tendency to improve color development.

In the present specification, the "particle diameter" represents the average particle diameter based on volume. The average particle diameter of the hollow resin particles can be measured by, for example, a particle size distribution measuring apparatus using a laser diffraction scattering method as a measurement principle. For example, a particle size analyzer (for example, "Microtrac UPA" manufactured by Nikkiso Co., Ltd.) using a dynamic scattering method as a measurement principle can be used as a laser diffraction-type particle size distribution measuring apparatus.

The content (solid content) of the hollow resin particles relative to the total mass of the white ink composition is preferably 5% to 20% by mass, more preferably 8% to 15% by mass, and still more preferably 9% to 12% by mass. When the content (solid content) of the hollow resin particles exceeds 20% by mass, reliability of clogging of the ink jet recording head may be degraded. While when the content is less than 5% by mass, the whiteness tends to become insufficient.

The content ratio, A/B ratio, of the content (A) of the hollow resin particles to the content (B) of the resin particles is preferably 0.8 to 2.0, more preferably 0.9 to 1.5, and still more preferably 1.0 to 1.3. When the content ratio of the hollow resin particles to the resin particles is within the range described above, both good color development and good abrasion resistance and ejection reliability may be achieved.

Production Method

A method for producing the hollow resin particles is not particularly limited, and a known method can be applied. For example, a so-called emulsion polymerization method can be applied as the method for producing the hollow resin particles, in which a hollow resin particle emulsion is formed by stirring a vinyl monomer, a surfactant, a polymerization initiator, a crosslinking agent, and an aqueous dispersion medium under heating in a nitrogen atmosphere.

The vinyl monomer is, for example, a nonionic monoethylene unsaturated monomer, and examples thereof include styrene, vinyltoluene, ethylene, vinyl acetate, vinyl chloride, vinylidene chloride, acrylonitrile, (meth)acrylamide, (meth)acrylic acid, (meth)acrylate esters, and the like. Examples of (meth)acrylate esters include methyl acrylate, methyl methacrylate, ethyl (meth)acrylate, butyl (meth)acrylate, 2-hydroxyethyl methacrylate, 2-ethylhexyl (meth)acrylate, benzyl (meth)acrylate, lauryl (meth)acrylate, oleyl (meth)acrylate, palmityl (meth)acrylate, stearyl (meth)acrylate, and the like.

Also, a difunctional vinyl monomer can be used as the vinyl monomer. Examples of the difunctional vinyl monomer include divinyl benzene, ally methacrylate, ethylene glycol dimethacrylate, 1,3-butanediol dimethacrylate, diethylene glycol dimethacrylate, trimethylolpropane trimethacrylate, and the like. When the monofunctional vinyl monomer is copolymerized with the difunctional vinyl monomer to form a high-degree of crosslinkage, there is a tendency to enable to produce the hollow resin particles having not only light scattering characteristics but also the characteristics such as heat resistance, solvent resistance, solvent dispersibility, and the like.

The surfactant may be a surfactant which forms a molecular aggregate such as micelle in water, and examples thereof include an anionic surfactant such as sodium alkylbenzene sulfonate, a nonionic surfactant, a cationic surfactant, an amphoteric surfactant, and the like.

A known water-soluble compound or the like can be used as the polymerization initiator, and examples thereof include hydrogen peroxide, potassium persulfate, and the like.

Examples of the crosslinking agent include 1,3-diethylbenzene and the like. Examples of the aqueous dispersion medium include water, water containing a hydrophilic organic solvent, and the like.

Also, a commercial product may be used as the hollow resin particles. Examples of the commercial product include ROPAQUE HT1432 (trade name manufactured by Dow Chemical Company, styrene-acrylic resin, Tg: 123° C., particle diameter: 500 nm).

1. 2. Resin Particles

The white ink jet ink composition according to the present embodiment contains the resin particles, the resin particles are composed of an acrylic resin or urethane resin, and the content of the resin particles is 5% by mass or more relative to the total mass of the ink composition.

Resin

The resin particles have the function of improving the adhesion of the ink adhered to the recording medium, that is, the function as a so-called fixing resin. For example, resin particles composed of an acrylic resin or urethane resin can be used as the resin particles used in the present disclosure. The resin particles are often handled in an emulsion form, but may be in a powder form.

The acrylic resin is a generic name of polymers produced by polymerizing as one component at least an acrylic monomer such as acrylic acid, methacrylic acid, an acrylate ester, a methacrylate ester, or the like. Examples thereof include a resin produced from an acrylic monomer, a copolymer of an acrylic monomer and another monomer, and the like. For example, an acrylic-vinyl resin which is a copolymer of an acrylic monomer and a vinyl-based monomer can be used. Further, for example, a copolymer with a vinyl-based monomer such as styrene can be used.

When a resin which is an acrylic resin and also corresponds to another type of resin is discriminated to be either the acrylic resin or the other type of resin, the resin having 50% by mass or more of a structure derived from the acrylic monomer is regarded as the acrylic resin.

Usable examples of the acrylic monomer include acryl amide, acrylonitrile, and the like. In the present specification, the acrylic resin may be a styrene-acrylic resin described later.

A commercial product of the resin emulsion formed by using the acrylic resin as a raw material may be used, and examples thereof include Boncoat (registered trademark) 4001: trade mane manufactured by DIC Corporation, Polysol (registered trademark) AM-710, AM-920, AM-2300, AP-4735, AT-860, and PSASE-4210E: trade name manufactured by Showa Denko K. K., Saivinol (registered trademark) SK-200: trade name manufactured by Saiden Chemical Industry Co., Ltd., AE-120A: trade name manufactured by JSR Corporation, Vinyblan (registered trademark) 2682: trade name manufactured by Nissin Chemical Industry Co., Ltd., Movinyl (registered trademark) 952B and 718A: trade name manufactured by Nippon Synthetic Chemical Industry Co., Ltd., K-854: trade name manufactured by Chuo Rika Kogyo Corporation, Nipol LX852 and LX874: trade name manufactured by Zeon Corporation, and the like.

The styrene-acrylic resin is a copolymer produced from a styrene monomer and an acrylic monomer, and examples thereof include a styrene-acrylic acid copolymer, a styrene-methacrylic acid copolymer, a styrene-methacrylic acid-acrylate ester copolymer, a styrene-α-methylstyrene-acrylic acid copolymer, a styrene-α-methylstyrene-acrylic acid-acrylate ester copolymer, and the like. The styrene-acrylic resin is included in the acrylic resin.

A commercial product of the resin emulsion produced by using the styrene-acrylic resin as a raw material may be used, and examples thereof include Microgel (registered trademark) E-1002 and E-5002: trade name manufactured by Nippon Paint Co., Ltd., Boncoat (registered trademark) 5454: trade name manufactured by DIC Corporation, Polysol (registered trademark) AP-7020 and SAE1014: trade name manufactured by Showa Denko K. K., Vinyblan (registered trademark) 2586: trade name manufactured by Nissin Chemical Industry C., Ltd., Arrowbase (registered trademark) CB-1200 and CD-1200: trade name manufactured by Unitika Ltd., Movinyl (registered trademark) 966A, 7320, and 975N: trade name manufactured by Nippon Synthetic Chemical Industry Co., Ltd., Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610: trade mane manufactured by BASF Corporation, and the like.

The urethane-based resin is a generic name of resins having a urethane bond. The urethane-based resin used may be a polyether-type urethane resin containing an ether bond other than a urethane bond in the main chain, a polyester-type urethane resin containing an ester bond in the main chain, or a polycarbonate-type urethane resin containing a carbonate bond in the main chain.

A commercial product of the resin emulsion produced by using the urethane-based resin as a raw material may be used, and examples thereof include Superflex (registered trademark) 870, 800, 150, 420, 460, 470, 610, 700, 460s, 840, and E-4000: trade name manufactured by Dai-Ichi Kogyo Seiyaku Co., Ltd., Permarin (registered trademark) UA-150: trade name, manufactured by Sanyo Chemical Industries, Ltd., Sancure (registered trademark) 2710: trade name, manufactured by Nippon Lubrizol Corporation, Neo-Rez (registered trademark) R-9660, R-9637, and R-940: trade name manufactured by Kusumoto Chemical Industries, Ltd., Adeka Bontiter (registered trademark) HUX-380 and 290K: trade name manufactured by ADEKA Corporation, Resamin (registered trademark) D-1060, D-2020, D-4080, D-4200, D-6300, and D-6455: trade name manufactured by Dainichiseika Color & Chemicals Mfg. Co., Ltd., Takerack (registered trademark) W-6020, W-635, W-6061, W-605, W-635, W-6021, and W-512-A-6: trade name manufactured by Mitsui Chemicals Polyurethane Co., Ltd., and the like.

Among these resins, the resin particles used in the present disclosure are preferably made of the acrylic resin. When the resin particles contain the acrylic resin and the hollow resin particles contain the acrylic resin, these resins are the same type of resin, and thus the adhesion at the interfaces between the hollow resin particles and the resin particles can be improved, thereby enabling to improve abrasion resistance.

On the other hand, when the resin particles are composed of the urethane-based resin, color development may be improved.

Physical Properties Etc.

The glass transition temperature (Tg) of the resin particles is preferably −50° C. or more and 200° C. or less, more preferably −50° C. or more and 100° C. or less, still more preferably −50° C. or more and 0° C. or less, and particularly preferably −40° C. or more and −20° C. or less. When the glass transition temperature (Tg) of the resin particles is within the range described above, the mesh sealing effect on the recording medium is improved, thereby causing a tendency to more improve color development. The glass transition temperature can be measured by, for example, using a differential scanning calorimeter "DSC7000" manufactured by Hitachi High-Tech Science Corporation according to Testing methods for transition temperatures of plastics, JIS K7121.

The content (solid content) of the resin particles relative to the total mass of the ink composition is 5.0% by mass or more, preferably 5.5% by mass or more, more preferably 6.0% by mass or more, still more preferably 6.5% by mass or more, and particularly preferably 7.0% by mass or more. The content is more preferably 7.5% by mass or more, still more preferably 8.0% by mass or more, and particularly preferably 8.5% by mass or more. On the other hand, the upper limit of the content (solid content) of the resin particles is not particularly limited, but the upper limit relative to the total mass of the ink composition is preferably 15% by mass or less, more preferably 13% by mass or less, and still more preferably 11% by mass or less. By using the resin particles at a specific content or more, the mesh sealing effect on the recording medium can be obtained, and thus permeation of the hollow resin particles into the recording medium can be suppressed, thereby consequently improving the color development.

1. 3. Water

The white ink jet ink composition according to the present embodiment contains water. The water may be contained as a main solvent component of the white ink jet ink composition and is a component which is evaporated and scattered by drying.

The water is preferably pure water or ultrapure water, such as ion exchange water, ultrafiltered water, reverse osmosis water, distilled water, or the like, from which ionic impurities are removed as much as possible. In addition, water sterilized by ultraviolet irradiation, hydrogen peroxide addition, or the like is preferably used because the occurrence of molds or bacteria can be suppressed when the ink is stored for a long period of time.

The content of water relative to the total mass of the ink composition is preferably 45% by mass or more, more preferably 50% by mass or more and 98% by mass or less, and still more preferably 55% by mass or more and 95% by mass or less.

1. 4. Organic Solvent

The white ink jet ink composition according to the present embodiment preferably contains an organic solvent. The organic solvent is preferably a water-soluble organic solvent. One of the functions of the organic solvent is to improve the wettability of the ink to the recording medium and to enhance the moisture retention property of the ink. Examples of the water-soluble organic solvent include polyhydric alcohols, alkylene glycol ethers, esters, cyclic esters, nitrogen-containing solvents, and the like.

Polyhydric Alcohol

Examples of polyhydric alcohols include a polyhydric alcohol having a standard boiling point of 270° C. or more, a polyhydric alcohol having a standard boiling point of 150° C. or more and less than 270° C.

Standard Boiling Point of 270° C. or More

Examples of a polyhydric alcohol having a standard boiling point of 270° C. or more include triethylene glycol (standard boiling point: 287° C.), glycerin (standard boiling point: 290° C.), trimethylolpropane (standard boiling point: 295° C.), polyethylene glycol monomethyl ether, and the like.

The white ink jet ink composition according to the embodiment preferably contains a polyhydric alcohol having a standard boiling point of 270° C. or more as the water-soluble organic solvent at a content of 15% by mass or less relative to the total mass of the ink composition. On the other hand, the content is preferably 5% by mass or more, more preferably 7% by mass or more, and still more preferably 9% by mass or more.

When the polyhydric alcohol having a standard boiling point of 270° C. or more is contained within the range described above, ejection reliability can be secured, and a decrease in color development can be suppressed. When the ink contains a large amount of the polyhydric alcohol having a standard boiling point of 270° C. or more, the ink is required to be heated at a high temperature or heated for a long time for drying. In this case, the hollow resin particles contained in the ink may be deformed by melting or the like, thereby decreasing the color development. Therefore, in order to suppress a decrease in color development, the amount of the polyhydric alcohol having a standard boiling point of 270° C. or more is preferably a predetermined amount or less. On the other hand, in order to suppress clogging of nozzles or the like with the resin particles and to secure ejection reliability, the polyhydric alcohol having a standard boiling point of 270° C. or more is preferably contained.

When the polyhydric alcohol having a standard boiling point of 270° C. or more is contained within the range described above, the organic solvent hardly remains on the recording medium during drying, and also abrasion resistance may be improved. In the recording method described later, the color development may be improved by increasing the amount of the ink adhered in the white ink adhering step or by decreasing the heating temperature in the heat drying step. However, this recording method easily causes insufficient drying of the ink and poor abrasion resistance. While when the white ink jet ink composition according to the embodiment contains the polyhydric alcohol having a standard boiling point of 270° C. or more within the range described above, good abrasion resistance can be easily secured due to the good drying property of the ink even when the recording method described above is used.

Standard Boiling Point of 150° C. or More and Less than 270° C.

Examples of a polyhydric alcohol having a standard boiling point of 150° C. or more and less than 270° C. include 1,2-alkanediols, polyols, and the like.

Examples of 1,2-alkanediols include ethylene glycol, propylene glycol, 1,2-butanediol, 1,2-pentanediol, 1,2-hexanediol, 1,2-heptanediol, 1,2-octanediol, and the like.

Examples of polyols include diethylene glycol, dipropylene glycol, 1,3-propanediol, 1,3-butanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, and the like.

The white ink jet ink composition according to the embodiment preferably contains 5% by mass or more of a polyhydric alcohol having a standard boiling point of 150° C. or more and less than 270° C. as the water-soluble organic solvent, and may contain 7% by mass or more, 10% by mass or more, or 14% by mass or more. The upper limit value of the polyhydric alcohol having a standard boiling point of 150° C. or more and less than 270° C. is not particularly limited, but is preferably 25% by mass or less, more preferably 20% by mass or less, and still more preferably 15% by mass or less. When the polyhydric alcohol having a standard boiling point of 150° C. or more and less than 270° C. is contained within the range described above, the drying property of the ink tends to be improved. Thus, the amount of heat required for drying can be decreased, and a decrease in color development can be suppressed.

As described above, when the white ink composition contains a polyhydric alcohol having a standard boiling point of 270° C. or more within the range described above and a polyhydric alcohol having a standard boiling point of 150° C. or more and less than 270° C. less within the range described above, both good color development and good ejection reliability can be obtained.

Alkylene Glycol Ethers

The alkylene glycol ethers may be alkylene glycol monoethers or diethers, and are preferably alkyl ethers.

Examples of alkylene glycol monoalkyl ethers include ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, and the like.

Examples of alkylene glycol dialkyl ethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether, and the like.

The content of the alkylene glycol ether is not particularly limited, but the content relative to the total mass of the ink composition is preferably 0.1% to 4.0% by mass, more preferably 0.3% to 3.0% by mass, still more preferably 0.5% to 2.0% by mass, and particularly preferably 0.7% to 1.5% by mass.

Esters

Examples of esters include glycol monoacetates, glycol diesters, and the like.

Examples of glycol monoacetates include ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate, and the like.

Examples of glycol diesters include ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, dipropylene glycol acetate propionate, and the like.

Cyclic Esters

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, ε-decanolactone, and the like; and a compound in which a hydrogen of a methylene group adjacent to a carbonyl group of any one of these esters is substituted by an alky group having 1 to 4 carbon atoms.

Nitrogen-Containing Solvent

Example of a nitrogen-containing solvent include cyclic amides, noncyclic amides, and the like. The noncyclic amides are, for example, alkoxyalkylamides and the like.

Cyclic Amides

The cyclic amides are, for example, lactams, and examples thereof include pyrrolidones such as 2-pyrrolidone, 1-methyl-2-pyrrolidone, 1-ethyl-2-pyrrolidone, 1-propyl-2-pyrrolidone, 1-butyl-2-pyrrolidone, and the like. These are preferred in view of promoting film formation of the resin particles, and 2-pyrrolidone is more preferred.

Noncyclic Amides

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Also, alkoxyalkylamides which are compounds represented by general formula (1) below can be used as the noncyclic amides.

$$R^1-O-CH_2CH_2-(C=O)-NR^2R^3. \tag{1}$$

In the formula (1), $R^1$ represents an alky group having 1 or more and 4 or less of carbon atoms, and $R^2$ and $R^3$ each independently represent a methyl group or an ethyl group. An "alky group having 1 or more and 4 or less of carbon atoms" may be a linear or branched alkyl group, and examples thereof include a methyl group, an ethyl group, a n-propyl group, an iso-propyl group, a n-butyl group, a sec-butyl group, an iso-butyl group, and a tert-butyl group. The compounds represented by the formula (1) may be used alone or in combination of two or more.

These organic solvents may be used alone or in combination of two or more.

1. 5. Lubricant

The white ink jet ink composition according to the embodiment preferably contains a lubricant (wax).

Examples of the lubricant include waxes such as vegetable/animal maxes such as carnauba wax, candelilla wax, beeswax, rice wax, lanolin, and the like; mineral-based waxes such as montane wax, ozokerite, and the like; paraffin wax as so-called petroleum wax; synthetic waxes such as carbon wax, Hoechst wax, polyolefin wax, silicone wax, stearic acid amide, and the like; and natural/synthetic wax emulsions and compound waxes such as α-olefin-maleic anhydride copolymer and the like.

These waxes can be used alone or as a mixture of plural types. Among these, silicone wax, polyolefin wax, paraffin wax, and the like are preferably used.

Examples of a commercial product of silicone wax include SM8706EX, SM7036EX, SM7060EX, SM7025EX, SM490EX, SM8701EX, SM8709SR, SM8716SR, IE-7045, IE-7046T, SH7024, BY22-744EX, BY22-818EX, FZ-4658, FZ-4634EX, and FZ-4602 (above trade names, manufactured by Toray Dow Corning, Co., Ltd.), POLON-MF-14, POLON-MF-14EC, POLON-MF-23POLON-MF-63, POLON-MF-18T, POLON-MF-56, POLON-MF-49, POLON-MF-33A, POLON-MF-55T, POLON-MF-28T, POLON-MF-50, POLON-MK-206, POLON-SR-CONC, KM-9771, KM-9774, KM-2002-T, KM-2002-L-1, KM-9772, KS-7002, KS-701, and X-51-1264 (above trade names, manufactured by Shin-Etsu Chemical Industry Co., Ltd.), and the like.

Examples of polyolefin wax include waxes and copolymers thereof produced from olefins, such as ethylene, propylene, butylene, and the like, or derivatives thereof; and specific examples include polyethylene-based wax, polypropylene-based wax, polybutylene-based wax, and the like. The polyolefin waxes can be used alone or in combination of two or more.

Examples of a commercial products of polyolefin wax include AQUACER Series such as AQUACER 513, AQUACER 507, AQUACER 515, AQUACER 840, and AQUACER 1547 (above trade names, manufactured by BYK Chemie Japan K. K., polyethylene-based wax), Hitech Series such as High Tech E-7025P, Hitech E-2213, Hitech E-6500, High Tech E-6314, Hitech E-9460, Hitech E-9015 (melting point: 137° C.), Hitech E-4A, Hitech E-5403P, and Hitech E-8237 (melting point: 106° C.) (above trade names, manufactured by Toho Chemical Co., Ltd., polyethylene-based wax), and the like; Nopcoat PEM-17 (trade name, manufactured by San Nopco, Ltd., polyethylene emulsion, average particle diameter: 40 nm); and the like.

The paraffin wax is a so-called petroleum wax. The "paraffin" represents an alkane having 20 or more carbon atoms, and in the present specification, the "paraffin wax" represents a hydrocarbon compound having a molecular weight of about 300 to 500 and containing a linear paraffinic hydrocarbon having 20 or more and 30 of less carbon atoms as a main component and a small amount of iso-paraffin.

Examples of a commercial product of paraffin wax include AQUACER 537 and AQUACER 539 (above trade names, manufactured by BYK Chemie Japan K. K.), and the like.

In the present embodiment, the lubricant is preferably contained in the ink in a fine particle state, that is, an emulsion state or a suspension state. Thus, the viscosity of the ink can be easily adjusted to be within a proper range for ejection using an ink jet head, and ejection reliability and intermittent ejection characteristics during recording can be easily secured.

The melting point of the lubricant is preferably 130° C. or less, more preferably 120° C. or less, and still more preferably 110° C. or less. Also, the melting point of the lubricant is preferably, but not limited to, 80° C. or more. The hollow resin particles contained in the white ink jet ink composition according to the present embodiment may be decreased in color development due to thermal breakage of the hollow structure. Therefore, in the recording method described later, the heating temperature may be decreased or the heating time may be shortened in the heat drying step so as to prevent color development from deteriorating due to a change in shape of the hollow resin particles. However, in this case, the organic solvent somewhat remains in the recording medium, thereby degrading abrasion resistance. On the other hand, in the present embodiment, the lubricant having a melting point within the range described above is further contained, and this contributes to an improvement of abrasion resistance and thus can satisfy both the color development and abrasion resistance.

The content of the lubricant relative to the total mass of the ink composition is preferably 0.1% to 10% by mass and more preferably 0.5% to 2.0% by mass. When the content of the lubricant is within the range described above, there is a tendency that a recorded matter having more excellent abrasion resistance can be obtained.

1. 6. Crosslinking Agent

The white ink jet ink composition according to the embodiment preferably contains a crosslinking agent.

The crosslinking agent is not particularly limited as long as it enables crosslinking reaction between resin particles, between the hollow resin particles, or between the resin particle and the hollow resin particle. Examples thereof include a carboxyl group reaction-type crosslinking agent, a hydroxyl group reaction-type crosslinking agent, a carbonyl group reaction-type crosslinking agent, and the like. In this case, the crosslinking reaction is a reaction of bonding together high molecules having a chain-like structure by any method to form a new chemical bond, which is newly developed to a three-dimensional net-like structure. The reaction includes the case where high molecules having already a partially crosslinked structure are further crosslinked and also corresponds to the case where the dissolved resin is precipitated by forming higher molecules. In addition, the crosslinking reaction includes so-called curing reaction.

Examples of the carboxyl group reaction-type crosslinking agent include a polycarbodiimide-based crosslinking agent having a carbodiimide group in its molecule, an oxazoline-based crosslinking agent having an oxazoline group in its molecule, an aziridine-based crosslinking agent, and the like. Examples of the carbodiimide include Carbodilite E-02 and E-03A manufactured by Nisshinbo Chemical Inc., and examples of the oxazoline include Epocros K-2010E, K-2020E (reaction temperature: 80° C. to 100° C.), and K-2030E manufactured by Nippon Shokubai Co., Ltd.

Examples of the hydroxyl group reaction-type crosslinking agent include a melamine resin-based crosslinking agent such as butylated melamine, full etherified melamine, and the like; an isocyanate-based crosslinking agent such as aqueous block isocyanate and the like; and the like. Such an isocyanate-based crosslinking agent has an active isocyanate group protected by a blocking agent and thus maintains stability in a usual state, but the blocking agent is dissociated by heat treatment to reproduce the active isocyanate group, which undergoes crosslinking reaction. Examples of such a crosslinking agent include Elastoron BN-69 and 11 manufactured by Dai-ichi Kogyo Seiyaku Co., Ltd., SU-268A, NBP-8730, and NBP-211 (reaction temperature: 150° C. or more) manufactured by Meisei Chemical Works, Ltd., and the like.

The carbonyl group reaction-type crosslinking agent is, for example, a dihydrazide type or the like.

The crosslinking agents may be used alone or in combination of two or more.

Among these crosslinking agents, the crosslinking agent having a reaction temperature of 130° C. or less is preferred, and 120° C. or less is more preferred, 110° C. or less is still more preferred, and 100° C. or less is particularly preferred. The crosslinking agent having a reaction temperature within the range described above allows crosslinking at a relatively low temperature. The hollow resin particles contained in the white ink jet ink composition according to the present embodiment may be decreased in color development due to thermal breakage of the hollow structure, and thus in the recording method described later, the heat drying step may be performed at a lower heating temperature for a shorter heating time in order to prevent the color development from deteriorating due to a change in shape of the hollow resin particles. However, in this case, the organic solvent somewhat remains in the recording medium, thereby easily degrading abrasion resistance. While in the present embodiment, the crosslinking agent capable of crosslinking even at a relatively low temperature is further contained, and this contributes to improvement in abrasion resistance and consequently can satisfy both the color development and the abrasion resistance.

Relative to 1.0 parts by mass of the resin particles, the crosslinking agent is preferably contained at 0.04 parts by mass or more and 1.0 parts by mass or less, more preferably contained at 0.05 parts by mass or more and 0.5 parts by mass or less, still more preferably contained at 0.08 parts by mass or more and 0.3 parts by mass or less, and particularly preferably contained at 0.1 parts by mass or more and 0.2 parts by mass or less. When the content of the crosslinking agent is within the range described above, abrasion resistance and ejection reliability tend to be more improved.

The content of the crosslinking agent relative to the total mass of the ink composition is preferably 0.1% by mass or more and 10% by mass or less, more preferably 0.3% by mass or more and 3.0% by mass or less, and still more preferably 0.5% by mass or more and 1.5% by mass or less. When the content of the crosslinking agent is within the range described above, abrasion resistance and ejection reliability tend to be more improved.

1. 7. Other Components

The white ink jet ink composition according to the present embodiment may contain a pH adjuster, a surfactant, etc.

pH Adjuster

The white ink jet ink composition according to the present embodiment may contain a pH adjuster for the purpose of adjusting pH. The pH adjuster is, but not particularly limited to, for example, an acid, a base, a weak acid, a weak base, or combination of these, and examples thereof include tertiary alkanolamines such as triethanolamine, triisopropanolamine, and the like. When the pH adjuster is added, for example, the total amount relative to the total mass of the ink composition is preferably 0.01% by mass or more and 2.0% by mass or less, more preferably 0.1% by mass or more and 1.0% by mass or less, and still more preferably 0.2% by mass or more and 0.5% by mass or less.

Surfactant

The white ink jet ink composition according to the present embodiment may contain a surfactant. The surfactant can be used as a wetting agent for adjusting the wettability and permeability to the recording medium by decreasing the surface tension of the ink composition. Also, when the ink composition contains the surfactant, the reliability of ejection from an ink jet head can be secured.

Any one of a nonionic surfactant, an anionic surfactant, a cationic surfactant, and an amphoteric surfactant can be used as the surfactant, and these may be used in combination. Among the surfactants, an acetylene glycol-based surfactant, a silicone-based surfactant, and a fluorine-based surfactant can be preferably used.

Examples of the acetylene glycol-based surfactant include, but are not particularly limited to, Surfynol (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (above trade names, manufactured by Nissin Chemical Industry Co., Ltd.), Olfine (registered trademark) B, Y, P, A, STG, SPC, E1004, E1010, PD-001, PD-002W, PD-003, PD-004, PD-005, EXP. 4001, EXP. 4300, EXP. 4036, EXP. 4051, AF-103, AF-104, AK-02, SK-14, and AE-3 (above trade names, manufactured by Nissin Chemical Industry Co., Ltd.), and Acetylenol (registered trademark) E00, E00P, E40, and E100 (above trade names, manufactured by Kawaken Fine Chemical Co., Ltd.).

The silicone-based surfactant is preferably, but not limited to, a polysiloxane compound. Examples of the polysiloxane compound include, but are not particularly limited to, polyether-modified organosiloxane. Examples of a commercial product of the polyether-modified organosiloxane include BYK (registered trademark)-306, BYK-307, BYK-333, BYK-341, BYK-345, BYK-346, and BYK-348 (above trade names, manufactured by BYK Corporation), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (above trade names, manufactured by Shin-Etsu Chemical Co., Ltd.), and the like.

A fluorine-modified polymer is preferably used as the fluorine-based surfactant, and examples thereof include, but are not particularly limited to, BYK (registered trademark)-340 (trade name, manufactured by BYK Chemie Japan K. K.).

When the ink composition contains the surfactant, plural types of surfactants can be used, and the total content relative to the total mass of the ink is preferably 0.01% by mass or more and 3.0% by mass or less, more preferably 0.05% by mass or more and 2.0% by mass or less, still more preferably 0.1% by mass or more and 1.5% by mass or less, and particularly preferably 0.2% by mass or more and 1.0% by mass or less.

Component Other than the Above

The white ink jet ink composition according to the present embodiment may contain as components other than the above additives which can be usually used in an ink for ink jet, such as a chelating agent, a preservative, an anti-mold agent, an anti-rust agent such as benzotriazole, an antioxidant, an ultraviolet absorber, an oxygen absorber, a solubilizer, and the like.

1. 8. Preparation Method and Physical Properties

The white ink jet ink composition according to the present embodiment can be prepared by mixing the components described above in any desired order and, if required, removing impurities by filtration or the like. A method preferably used as a method for mixing the components includes sequentially adding materials to a vessel provided with a stirrer, such as a mechanical stirrer, a magnetic stirrer, or the like, and then stirring and mixing the components. If required, centrifugal filtration, a filter filtration, or the like can be performed as a filtration method.

In the present embodiment, from the viewpoint of balance between printing quality and reliability as an ink for ink jet, the surface tension of the ink composition at 20° C. is preferably 20 mN/m or more and 40 mN/m or less and more preferably 30 mN/m or more and 36 mN/m or less. With the surface tension within the range described above, ink jet recording has excellent ejection reliability, and during adhesion to the recording medium, the ink easily uniformly wet spreads on the recording medium and easily permeates into the recording medium. Thus, the ink may be easily fixed to the recording medium.

The surface tension can be measured by confirming the surface tension by using an automatic surface tensiometer CBVP-Z (trade name, manufactured by Kyowa Interface Science Co., Ltd.) when a platinum plate is wet with the ink in an environment of 20° C. A method for adjusting the surface tension to be within the range described above is to properly adjust the types of the organic solvent and surfactant described above and the amounts of these and water added, etc.

The viscosity of the ink at 20° C. is preferably 1.5 mPa·s or more and 15.0 mPa·s or less, more preferably 1.5 mPa·s or more and 5.0 mPa·s or less, and still more preferably 1.5 mPa·s or more and 3.6 mPa·s or less. When the viscosity of the ink at 20° C. is within the range described above, the ink can be more easily fixed to the recording medium during adhesion to the recording medium, thereby improving color development.

The viscosity can be measured by using a viscoelasticity tester MCR-300 (trade name, manufactured by Pysica Co., Ltd.). A method for adjusting the viscosity to be within the range described above is, for example, to properly adjust the types of organic solvent and surfactant described above, the amounts of these and water added, etc.

1. 9. Application

The white ink jet ink composition according to the present embodiment can be preferably applied to and used in a recording apparatus provided with a recording head having a circulation passage. Also, the white ink jet ink composition according to the present embodiment is preferably used for ink jet textile printing.

1. 9. 1. Recording Apparatus Provided with Recording Head Having Circulation Passage The white ink jet ink composition according to the present embodiment can be preferably applied to and used in a recording apparatus provided with a recording head having a circulation passage. The white ink jet ink composition according to the present embodiment contains the resin particles in a relatively large amount, and thus an aggregate easily occurs in nozzles of the recording head, thereby easily causing clogging. In particular, when the amount of a polyhydric alcohol having a standard boiling point of 270° C. or more as the water-soluble organic solvent is a predetermined amount or less, clogging easily significantly occurs in association with an improvement in drying property. Therefore, when the white ink jet ink composition according to the present embodiment is applied to a recording apparatus provided with a recording head having a circulation passage, clogging derived from the aggregate of the resin particles can be easily suppressed by ink circulation, and ejection reliability can be preferably improved.

The recording apparatus which can be applied in the present embodiment is described by giving an example of an ink jet recording apparatus provided with a recording head (also referred to as an "ink jet head" hereinafter) which ejects the ink by the ink jet method.

Also, the recording apparatus which can be applied to the present embodiment is described by giving an example of an on-carriage type printer including an ink cartridge mounted on a carriage. The recording apparatus which can be applied to the present embodiment is not limited to an on-carriage type printer and may be an off-carriage type printer including an ink cartridge fixed outside the printer.

The printer described below is a serial printer including an ink jet head for recoding which is mounted on a carriage moved in a predetermined direction and which is moved with movement of the carriage to eject droplets onto a recording medium. The recording apparatus which can be applied to the present embodiment is not limited to the serial printer and may be a line printer. The line printer is a printer of a type in which an ink jet head is formed with a width wider than the recording medium and droplets are ejected onto the recording medium without movement of the ink jet head.

A recording apparatus provided with a recording head which can be preferably used for the white ink jet ink composition according to the present embodiment and which has a circulation passage is described below with reference to the drawings. In each of the drawings used in description below, the scale of each of the members is properly changed so as to make recognizable the size of each of the members.

FIG. 1 is a schematic perspective view showing an ink jet recording apparatus which can be applied to the present embodiment. The ink jet recording apparatus is an apparatus which performs recording by landing droplets on the recording medium using an ink jet head serving as an ink ejection section which ejects fine droplets of the ink composition.

As shown in FIG. 1, a printer 1 includes an ink jet head 3, a carriage 4, a main scanning mechanism 5, a platen roller 6, and a control section (not shown) which controls the operation of the whole of the printer 1. The carriage 4 includes the ink jet head 3 mounted thereon and detachable ink cartridges 7a, 7b, 7c, 7d, 7e, and 7f each housing the ink composition to be supplied to the ink jet head 3.

The main scanning mechanism 5 includes a timing belt 8 connected to the carriage 4, a motor 9 which drives the timing belt 8, and a guide shaft 10. The guide shaft 10 is laid as a support member of the carriage 4 in the scanning direction of the carriage 4, that is, in the main scanning direction. The carriage 4 is driven by the motor 9 through the timing belt 8 to be reciprocable along the guide shaft 10. Thus, the main scanning mechanism 5 has the function of reciprocating the carriage 4 in the main scanning direction.

The platen roller 6 has the function of transporting the recording medium 2 in the sub-scanning direction perpendicular to the main scanning direction, that is, in the length direction of the recording medium 2. Thus, the recording medium 2 is transported in the sub-scanning direction. The carriage 4 including the ink jet head 3 mounted thereon can be reciprocated in the scanning direction substantially identical with the width direction of the recording medium 2, and the ink jet head 3 is configured to be capable of relative scanning of the recording medium 2 in the main scanning direction and the sub-scanning direction.

The ink cartridges 7a, 7b, 7c, 7d, 7e, and 7f are independent six ink cartridges. The white ink jet ink composition according to the present embodiment can be housed in each of the ink cartridges 7a, 7b, 7c, 7d, 7e, and 7f. Besides the white ink jet ink composition, color ink compositions having black, cyan, magenta, yellow, orange colors, etc. may be respectively housed in these ink cartridges, and these ink cartridges can be used in any combination. In FIG. 1, the number of the ink cartridges is 6, but is not limited to this. In addition, a supply port (not shown) is provided at the bottom of each of the ink cartridges 7a, 7b, 7c, 7d, 7e, and 7f in order to supply the ink composition housed in each of the ink cartridges to the ink jet head 3.

The ink jet head 3 is a unit which ejects and adheres the ink, supplied from the ink cartridges 7a, 7b, 7c, 7d, 7e, and 7f, from plural nozzles N to the recording medium 2 under control by the control section (not shown). The ink jet head 3 has, in a surface facing the recording medium 2 to which the ink is adhered, plural nozzles (refer to FIG. 2) which eject and adhere the ink to the recording medium 2. The plural nozzles are arranged in a line to form a nozzle line, and the nozzle line is individually disposed corresponding to each of the color inks. The color ink composition is supplied from each of the ink cartridges to the ink jet head 3 and ejected as droplets from the nozzles by an actuator (not shown) in the ink jet head 3. The droplets of the ink composition ejected are landed on the recording medium 2 to form an image, a text, a pattern, a color, or the like with the ink in a recording region of the recording medium 2.

The ink jet head 3 uses a piezoelectric element as an actuator serving as a drive unit, but is not limited to this system. For example, there may be used an electromechanical conversion element which displaces a vibrating plate serving as the actuator by electrostatic adsorption, or an electrothermal conversion element which ejects as droplets the ink composition by the bubbles produced by heating.

In this example, the ink jet head 3 is a head having a pressure chamber C (refer to FIG. 2) and a circulation passage in which the ink composition in the pressure chamber C is circulated. When the ink jet head 3 has the circulation passage, the ink in the pressure chamber C and nozzles N (refer to FIG. 2) is refreshed. Thus, clogging in the nozzles N can be suppressed, and ejection reliability and intermittent ejection characteristics can be improved.

In the present embodiment, the nozzle diameter is preferably 20 μm or more and 30 μm or less and more preferably 22 μm or more and 28 μm or less. With the nozzle diameter of 20 μm or more, the ink can be ejected without deterioration in disturbance of the ink in the flow passage, and intermittent ejection characteristics can be improved. In addition, by further using the head having the circulation passage, the intermittent ejection characteristics are more improved. With the nozzle diameter of 30 μm or less, the ink liquid surface has a proper surface area, and thus drying of the ink hardly proceeds, thereby stabilizing ejection. In the present specification, the nozzle diameter represents the inner diameter (that is, the inner diameter d1) of the nozzles formed in the surface of the nozzle plate.

Figure 2:
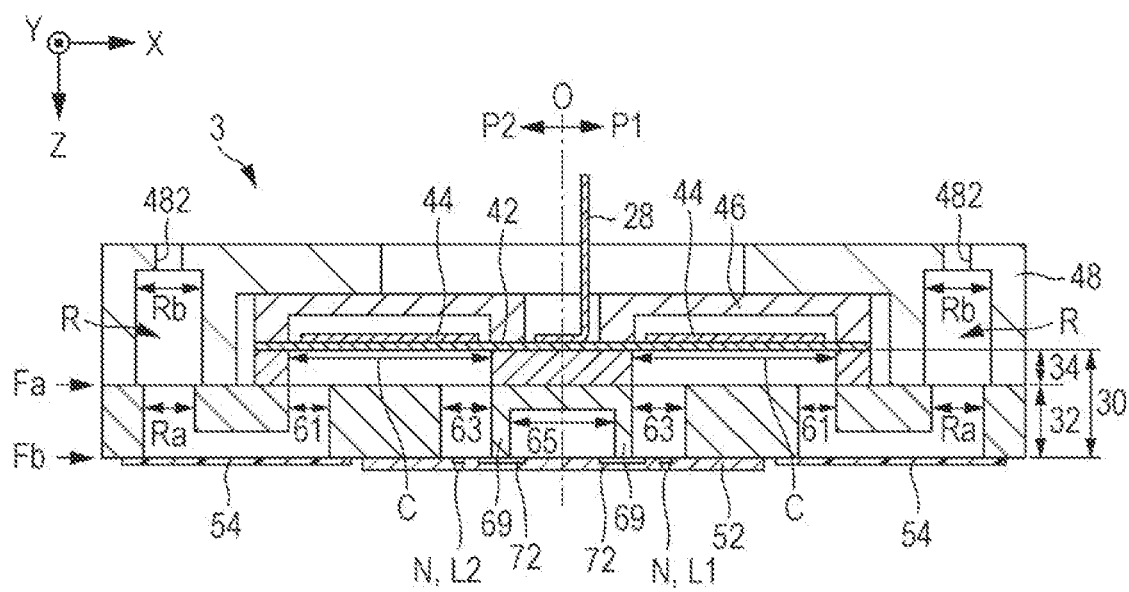
FIG. 2 is a sectional view of an ink jet head of an ink jet recording apparatus.
Figure 3:
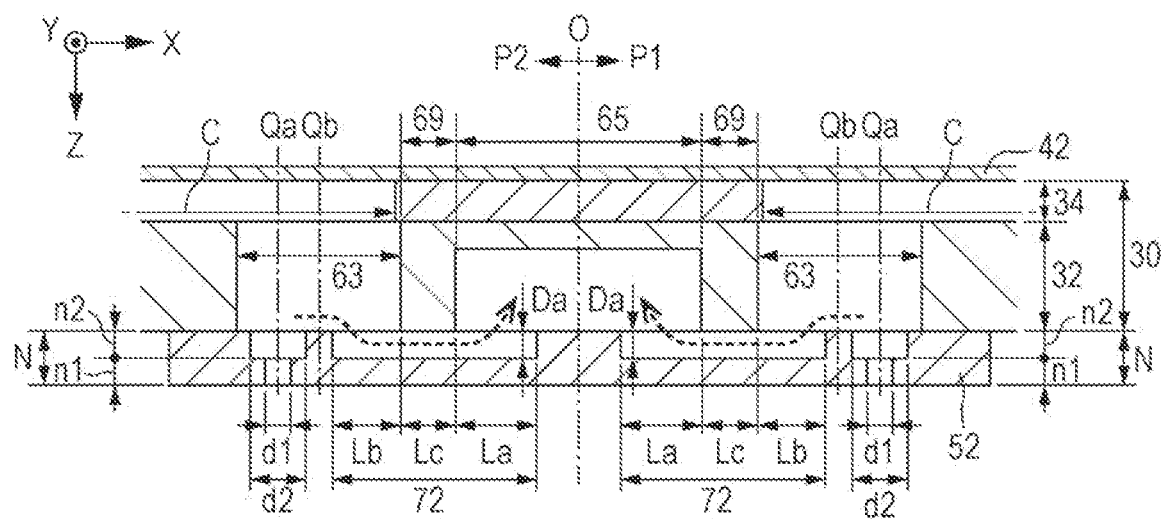
FIG. 3 is a sectional view of the vicinity of a circulating liquid chamber of an ink jet head.

FIG. 2 is a sectional view of the ink jet head 3 in a section perpendicular to the Y direction, and FIG. 3 is a partially exploded perspective view of the ink jet head 3. In FIG. 2, for example, the plane parallel to the surface of the recording medium 2 is referred to as the "X-Y plane", and the direction perpendicular to the X-Y plane is referred to as the "Z direction". The jet direction of the ink from the ink jet head 3 corresponds to the Z direction. In addition, the main scanning direction corresponds to the X direction, and the direction (sub-scanning direction) perpendicular to the main scanning direction corresponds to the Y direction.

The plural nozzles N of the ink jet head 3 are arranged in the Y direction to form a nozzle line. In the ink jet head 3, the plane, that is, the Y-Z plane O, passing through the center axis parallel to the Y direction and being parallel to the Z direction, is denoted by the "center surface" in the description below.

As shown in FIG. 2, the ink jet head 3 has a structure in which elements relating to the respective nozzles N of the first line L1 and the elements relating to the respective nozzles N of the second line L2 are arranged in plane symmetry with the center surface O disposed therebetween. That is, in the ink jet head 3, a positive-side portion (also referred to as the "first portion" hereinafter) P1 in the X direction and a negative-side portion (also referred to as a "second portion" hereinafter) P2 in the X direction, which are arranged with the center surface O disposed therebetween, have a substantially common structure. The plural nozzles N of the first line L1 are formed in the first portion P1, and the plural nozzles N of the second line L2 are formed in the second portion P2. The center surface O corresponds to the boundary surface between the first portion P1 and the second portion P2.

As shown in FIG. 2, the ink jet head 3 has a flow passage forming section 30. The flow passage forming section 30 is a structure in which flow passages are formed for supplying the ink to the plural nozzles N. In this example, the flow passage forming section 30 includes a laminate of a first flow passage substrate 32 and a second flow passage substrate 34. Each of the first flow passage substrate 32 and the second flow passage substrate 34 is a plate-like member long in the Y direction. The second flow passage substrate 34 is disposed on the Z-direction negative-side surface Fa of the first flow passage substrate 32 by, for example, using an adhesive.

As shown in FIG. 2, besides the second flow passage substrate 34, a case section 48 is disposed on the surface Fa of the first flow passage substrate 32. On the other hand, a nozzle plate 52 and a vibration absorber 54 are disposed on the Z-direction positive-side surface Fb, that is, the surface opposite to the surface Fa, of the first flow passage substrate 32. Substantially like the first flow passage substrate 32 and the second flow passage substrate 34, each of the elements of the ink jet head 3 is a plate-like member long in the Y direction, and the elements are joined to each other by, for example, using an adhesive. The lamination direction of the first flow passage substrate 32 and the second flow passage substrate 34, the lamination direction of the first flow passage substrate 32 and the nozzle plate 52, or the direction perpendicular to the surface of each of the plate-like elements can be also understood as the Z direction.

The nozzle plate 52 is a plate-like member in which the plural nozzles N are formed, and is disposed on the surface Fb of the first flow passage substrate 32 by, for example, using an adhesive. Each of the plural nozzles N is a circular through hole through which the ink is passed. In a first embodiment, the plural nozzles N constituting the first line L1 and the plural nozzles N constituting the second line L2 are formed in the nozzle plate 52. Specifically, in the nozzle plate 52, the plural nozzles N of the first line L1 are formed along the Y direction in a X-direction positive-side region as viewed from the center surface O, and the plural nozzles N of the second line L2 are formed along the Y direction in a X-direction negative-side region as viewed from the center surface O. The nozzle plate 52 is a single plate-like member continuing from a portion where the plural nozzles N of the first line L1 are formed to a portion where the plural nozzles N of the second line L2 are formed. The nozzle plate 52 is produced by processing a single crystal substrate of silicon by semiconductor manufacturing technology, for example, using a processing technique such as dry etching, wet etching, or the like. However, a known material and production method can be arbitrarily used for producing the nozzle plate 52.

As shown in FIG. 2, in the first flow passage substrate 32, a space Ra, plural supply passages 61, and plural communication passages 63 are formed in each of the first portion P1 and the second portion P2. The space Ra is an opening formed to be long along the Y direction in a plan view, that is, as viewed from the Z direction, and the supply passages 61 and the communication passages 63 are through holes formed for the respective nozzles N. The plural communication passages 63 are arranged in the Y direction in a plan view, and the plural supply passages 61 are arranged in the Y direction between the arrangement of the communication passages 63 and the space Ra. The plural supply passages 61 communicate with the space Ra in common. In addition, any one of the communication passages 63 overlaps the nozzle N corresponding to this communication passage 63. Specifically, any one of the communication passages 63 in the first portion P1 communicates with the nozzle N corresponding to this communication passage 63 of the first line L1. Similarly, any one of the communication passages 63 in the second portion P2 communicates with the nozzle N corresponding to this communication passage 63 of the second line L2.

As shown in FIG. 2, the second flow passage substrate 34 is a plate-like member in which plural pressure chambers C are formed for each of the first portion P1 and the second portion P2. The plural pressure chambers C are arranged in the Y direction. The pressure chambers C are formed for the respective nozzles N and are spaces long along the X direction in a plan view. Like the nozzle plate 52 described above, the first flow passage substrate 32 and the second flow passage substrate 34 are produced by processing a single-crystal substrate of silicon by using, for example, semiconductor manufacturing technology. However, a known material and production method can be arbitrarily used for producing the first flow passage substrate 32 and the second flow passage substrate 34. As described in the example, the flow passage forming section 30 and the nozzle plate 52 include a substrate made of silicon. Therefore, there is an advantage that fine flow passages can be formed with high precision in the flow passage forming section 30 and the nozzle plate 52 by, for example, using the semiconductor manufacturing technology as described above in the example.

As shown in FIG. 2, a vibration section 42 is disposed on the surface of the second flow passage substrate 34 on the side opposite to the first flow passage substrate 32. In this example, the vibration section 42 is an elastically vibratable plate-like member. In addition, in a plate-like member having a predetermined thickness, the second flow passage substrate 34 and the vibration section 42 can be integrally formed by selectively removing a thickness-direction portion of a region corresponding to the pressure chambers C.

As shown in FIG. 2, the surface Fa of the first flow passage substrate 32 faces the vibration section 42 with a space therebetween in each of the pressure chambers C. Each of the pressure chambers C is a space located between the surface Fa of the first flow passage substrate 32 and the vibration section 42, and a pressure change is generated in the ink filled in the space. Each of the pressure chambers C is a space having a longitudinal direction, for example, in the X direction and is formed separately for each of the nozzles N. The plural pressure chambers C are arranged in the Y direction in each of the first line L1 and the second line L2. As shown in FIG. 2, the center surface O-side end of any one of the pressure chambers C overlaps the communication passages 63 in a plan view, and the end on the side opposite to the center surface O overlaps the supply passages 61. Therefore, in each of the first portion P1 and the second portion P2, the pressure chambers C communicate with the nozzles N through the communication passages 63 and also communicate with the space Ra through the supply passages 61. In addition, a predetermined flow passage resistance can be added by forming a convergent passage having a narrowed passage width in the pressure chambers C.

As shown in FIG. 2, plural piezoelectric elements 44 corresponding to the different nozzles N are disposed in each of the first portion P1 and the second portion P2 on the surface of the vibration section 42 on the side opposite to the pressure chambers C. The piezoelectric elements 44 are passive elements which are deformed by supply of a drive signal. The plural piezoelectric elements 44 are arranged in the Y direction so as to correspond to the respective pressure chambers C. Any one of the piezoelectric elements 44 is, for example, a laminate including a piezoelectric layer disposed between two electrodes facing each other. In addition, an active portion which vibrates a portion which is deformed by supply of a drive signal, that is, the vibration section 42, can be defined as the piezoelectric element 44. In this example, when the vibration section 42 vibrates in conjugation with the deformation of the piezoelectric element 44, the pressure in the pressure chambers C is changed to allow the ink filled in the pressure chambers C to pass through the communication passages 63 and the nozzles N, jetting the ink.

A protection member 46 shown in FIG. 2 is a plate-like member for protecting the plural piezoelectric elements 44 and is disposed on the surface of the vibration section 42 or the surface of the second flow passage substrate 34. Any desired member and production method can be used for the protection member 46, but like the first flow passage substrate 32 and the second flow passage substrate 34, the protection member 46 can be formed by, for example, processing a silicon single-crystal substrate using semiconductor manufacturing technology. The plural piezoelectric elements 44 are housed in a recessed portion formed in the vibration section 42-side surface of the protection member 46.

The end of a wiring substrate 28 is joined to the surface of the vibration section 42 on the side opposite to the flow passage forming section 30 or the surface of the flow passage forming section 30. The wiring substrate 28 is a flexible mounting component on which plural wires (not shown) are formed for electrically connecting a control unit (not shown) to the ink jet head 3. In the wiring substrate 28, the end passing through an opening formed in the protection member 46 and an opening formed in the case section 48 and extending to the outside is connected to the control unit. For example, FPC (Flexible Printed Circuit), FFC (Flexible Flat Cable), or the like is preferably used as the flexible wiring substrate 28.

The case section 48 is a case which stores the ink to be supplied to the plural pressure chambers C and further to the plural nozzles N. The Z-direction positive-side surface of the case section 48 is joined to the surface Fa of the first flow passage substrate 32 by, for example, using an adhesive. Any desired known technique and production method can be used for producing the case section 48. For example, the case section 48 can be formed by injection-molding a resin material.

As shown in FIG. 2, in the case section 48, a space Rb is formed for each of the first portion P1 and the second portion P2. The spaces Rb of the case section 48 mutually communicate with the respective spaces Ra of the first flow passage substrate 32. A space configured by the spaces Ra and the spaces Rb functions as a liquid storage chamber R which stores the ink to be supplied to the plural pressure chambers C. The liquid storage chamber R is a common liquid chamber in common use for the plural nozzles N. The liquid storage chamber R is formed in each of the first portion P1 and the second portion P2. The liquid storage chamber R in the first portion P1 is located on the X-direction positive side as viewed from the center surface O, and the liquid storage chamber R in the second portion P2 is located on the X-direction negative side as viewed from the center surface O. In order to introduce the ink supplied from a liquid vessel (not shown) to the liquid storage chamber R, an inlet port 482 is formed in the surface of the case section 48 on the side opposite to the first flow passage substrate 32.

A vibration absorber 54 is disposed on the surface Fb of the first flow passage substrate 32 in each of the first portion P1 and the second portion P2. The vibration absorber 54 is a flexible film, that is, a compliance substrate, which absorbs pressure fluctuation of the ink in the liquid storage chamber R. For example, the vibration absorber 54 is disposed on the surface Fb of the first flow passage substrate 32 so as to close the spaces Ra and the plural supply passages 61 of the first flow passage substrate 32, constituting the wall surface, specifically the bottom, of the liquid storage chamber R.

In the first flow passage substrate 32, a space (referred to as a "circulating liquid chamber" hereinafter) 65 is formed in the surface Fb facing the nozzle plate 52. In this example, the circulating liquid chamber 65 is a long-shaped bottomed hole extending in the Y direction in a plan view. The opening of the circulating liquid chamber 65 is closed by the nozzle plate 52 joined to the surface Fb of the first flow passage substrate 32. The circulating liquid chamber 65 continues over the plural nozzles N along the first line L1 and the second line L2. Specifically, the circulating liquid chamber 65 is formed between the arrangement of the plural nozzles N of the first line L1 and the arrangement of the plural nozzles N of the second line L2. Therefore, the circulating liquid chamber 65 is located between the communication passages 63 in the first portion P1 and the communication passages 63 in the second portion P2. Thus, the flow passage forming section 30 is a structure in which there are formed the pressure chambers C and the communication passages 63 in the first portion P1, the pressure chambers C and the communication passages 63 in the second portion P2, and the circulating liquid chamber 65 located between the communication passages 63 in the first portion P1 and the communication passages 63 in the second portion P2. As shown in FIG. 2, the flow passage forming section 30 includes a wall-like portion (referred to as a "partition wall portion 69" hereinafter) which partitions between the circulating liquid chamber 65 and each of the communication passages 63.

As described above, the plural pressure chambers C and the plural piezoelectric elements 44 are arranged in the Y direction in each of the first portion P1 and the second portion P2. Therefore, in other words, it can be stated that the circulating liquid chamber 65 extends in the Y direction so as to continue over the plural pressure chambers C or the plural piezoelectric elements 44 in each of the first portion P1 and the second portion P2. Also, as shown in FIG. 2, the circulating liquid chamber 65 and the liquid storage chambers R extend in the Y direction with a space therebetween, and the pressure chambers C, the communication passages 63, and the nozzles N can be located in this space.

FIG. 3 is an enlarged sectional view of a portion near the circulating liquid chamber 65 of the ink jet head 3. As shown in FIG. 3, in the present embodiment, each of the nozzles N has a first section n1 and a second section n2. The first section n1 and the second section n2 are circular spaces coaxially formed and communicating with each other. The second section n2 is located on the flow passage forming section 30 side as viewed from the first section n1. In this embodiment, the center axis Qa of each of the nozzles N is located on the side opposite to the circulating liquid chamber 65 as viewed from the center axis Qb of each of the communication passages 63. The inner diameter d2 of the second section n2 is larger than the inner diameter d1 of the first section n1. As described above, the configuration in which each of the nozzles N is formed in a stepwise shape has an advantage that the passage resistance of each of the nozzles N can be easily set to a desired characteristic. In this example, the center axis Qa of each of the nozzles N is located on the side opposite to the circulating liquid chamber 65 as viewed from the center axis Qb of each of the communication passages 63.

As shown in FIG. 3, in the nozzle plate 52, plural discharge passages 72 are formed in the surface facing the flow passage forming section 30 in each of the first portion P1 and the second portion P2. The plural discharge passages 72 in the first portion P1 one-to-one correspond to the plural nozzles N of the first line L1 or the plural communication passages 63 corresponding to the first line L1. In addition, the plural discharge passages 72 in the second portion P2 one-to-one correspond to the plural nozzles N of the second line L2 or the plural communication passages 63 corresponding to the second line L2.

Each of the discharge passages 72 is a groove portion, that is, a long-shaped bottomed hole, extending in the X direction, and functions as a flow passage through which the ink is passed. In this example, the discharge passages 72 are formed at a position separated from the nozzles N, specifically on the circulating liquid chamber 65-side as viewed from the nozzles N corresponding to the discharge passages 72. For example, the plural nozzles N, particularly the second section n2, and the plural discharge passages 72, are integrally formed by a common process, for example, using the semiconductor manufacturing technology, for example, a processing technique such as dry etching, wet etching, or the like.

Each of the discharge passages 72 is formed in a linear shape with a flow passage width Wa equal to the inner diameter d2 in the second sections n2 of the nozzles N. In addition, in this example, the flow passage width Wa of the discharge passage 72 is smaller than the flow passage width Wb of the pressure chambers C. Therefore, in comparison with a configuration in which the flow passage width Wa of the discharge passages 72 is larger than the flow passage width Wb of the pressure chambers C, the passage resistance of the discharge passages 72 can be increased. On the other hand, the depth Da of the discharge passages 72 from the surface of the nozzle plate 52 is constant over the whole length. Specifically, each of the discharge passages 72 is formed with a depth equal to the second section n2 of the nozzles N. The configuration described above has an advantage that the discharge passages 72 and the second sections n2 can be easily formed as compared with a configuration in which the discharge passages 72 are formed with a depth different from the second sections n2. In addition, the "depth" represents the depth of the flow passages in the Z direction, for example, a difference in height between the formation surface of the flow passages and the bottom surface of the flow passages.

Any one of the discharge passages 72 in the first portion P1 is located on the circulating liquid chamber 65-side as viewed from the nozzle N corresponding to this discharge passage 72 of the first line L1. Also, any one of the discharge passages 72 in the second portion P2 is located on the circulating liquid chamber 65-side as viewed from the nozzle N corresponding to this discharge passage 72 of the second line L2. In each of the discharge passages 72, the side opposite to the center surface O overlaps one communication passage 63 corresponding to the relevant discharge passage 72 in a plan view. That is, the discharge passages 72 communicate with the communication passages 63. On the other hand, the center surface O-side end of each of the discharge passages 72 overlaps the circulating liquid chamber 65 in a plan view. That is, the discharge passages 72 communicate with the circulating liquid chamber 65. Thus, each of the plural communication passages 63 communicates with the circulating liquid chamber 65 through the discharge passage 72. Therefore, as shown by a brown line arrow in FIG. 3, the ink in each of the communication passages 63 is supplied to the circulating liquid chamber 65 through the discharge passage 72. That is, in this example, the plural communication passages 63 corresponding to the first line L1 and the plural communication passages 63 corresponding to the second line L2 communicate with one circulating liquid chamber 65 in common.

In any one of the discharge passages 72, FIG. 3 shows the flow passage length La of a portion overlapping the circulating liquid chamber 65, the flow passage length, that is, the dimension Lb in the X direction, of a portion overlapping the communication passages 63 in the discharge passage 72, and the flow passage length, that is, the dimension Lc in the X direction, of a portion overlapping the partition wall portion 69 of the flow passage forming section 30. The flow passage length Lc corresponds to the thickness of the partition wall portion 69. The partition wall portion 69 functions as a convergent portion of the discharge passages 72. Thus, the longer the flow passage length Lc corresponding to the thickness of the partition wall portion 69 is, the more increased the flow passage resistance of the discharge passages 72 is. This example establishes the relation that the flow passage length La is longer than the flow passage length Lb, and the flow passage length Ls is longer than the flow passage Lc. Further, this example establishes the relation that the flow passage Lb is longer than the flow passage length Lc. The configuration described above has an advantage that the ink is easily flowed into the circulating liquid chamber 65 from the communication passages 63 through the discharge passages 72 as compared with a configuration in which the flow passage length La and the flow passage Lb are shorter than the flow passage length Lc.

Therefore, in the ink jet head 3, the pressure chambers C indirectly communicate with the circulating liquid chamber 65 through the communication passages 63 and the discharge passages 72. That is, the pressure chambers C do not directly communicate with the circulating liquid chamber 65. In the configuration described above, when the pressure in the pressure chambers C fluctuates by the operation of the piezoelectric elements 44, a portion of the ink flowed into the communication passages 63 is jetted to the outside from the nozzles N, and a portion of the residue is flowed into the circulating liquid chamber 65 from the communicating passages 63 through the discharge passages 72. In addition, the inertance of the communication passages 63, the nozzles N, and the discharge passages 72 is selected so that of the ink flowing through the communication passages 63 by one time of drive of the piezoelectric elements 44, the jet of the ink jetted through the nozzles N exceeds the circulation amount of the ink flowed into the circulating liquid chamber 65 through the discharge passages 72 in the ink flowing through the communication passages 63. Assuming a case where all the piezoelectric elements 44 are simultaneously driven, it can be said in other words that the total circulation amount of flow into the circulating liquid chamber 65 from the plural communication passages 63, for example, the flow amount within a unit time in the circulating liquid chamber 65, is larger than the total amount of jet from the plural nozzles N.

Specifically, the passage resistance of each of the communication passages 63, the nozzles N, and the discharge passages 72 is determined so that the ratio of the circulation amount is 70% or more of the ink flowing through the communication passages 63, that is, the ratio of the jet amount of the ink, is 30% or less. In the configuration described above, the ink near the nozzles can be effectively circulated in the circulating liquid chamber 65 while the jet amount of the ink is secured. Schematically, there is a tendency that with the larger passage resistance of the discharge passages 72, the circulation amount is decreased, while the jet amount is increased, while with the smaller flow passage resistance of the discharge passages 72, the circulation amount is increased, while the jet amount is decreased.

For example, the printer 1 has a configuration provided with a circulation mechanism (not shown). The circulation mechanism is a mechanism that supplies, that is, circulates, the ink in the circulating liquid chamber 65 to the liquid storage chamber R. The circulation mechanism has a configuration provided with, for example, a suction mechanism, for example, a pump, that sucks the ink from the circulating liquid chamber 65, a filter mechanism (not shown) that collects the bubbles and foreign matters mixed in the ink, and a heating mechanism that decreases thickening by heating the ink. The bubbles and foreign matters are removed by the circulating mechanism, and the ink with decreased thickening is supplied to the liquid storage chamber R from the circulation mechanism through the inlet port 482. Thus, the ink is circulated in the path of the liquid storage chamber R→the supply passages 61→the pressure chambers C→the communication passages 63→the discharge passages 72→the circulating liquid chamber 65→the circulation mechanism→the liquid storage chamber R. A combination of the supply passages 61 and the discharge passages 72 is referred to as a "circulation passage".

Thus, when the discharge passages 72, which communicate the communication passages 63 with the circulating liquid chamber 65, are formed in the nozzle plate 52, the ink near the nozzles N can be effectively circulated to the circulating liquid chamber 65. In addition, the communication passages 63 corresponding to the first line L1 and the communication passages 63 corresponding to the second line L2 communicate with the circulating liquid chamber 65, disposed therebetween, in common, there is the advantage of simplifying the configuration of the ink jet head 3 and consequently realizing a small size as compared with a configuration provided separately with a circulating liquid chamber, with which each of the discharge passages 72 corresponding to the first line L1 communicates, and a circulating liquid chamber, with which each of the discharge passages 72 corresponding to the second line L2 communicates.

In addition, the configuration of this example may be a configuration in which the discharge passages 72 and the nozzles N are continued each other, not a configuration in which the discharge passages 72 and the nozzles N are separated from each other. Also, the configuration of this example may be a configuration in which besides the circulating liquid chamber 65, a circulating liquid chamber corresponding to each of the first portion P1 and the second portion P2 is formed.

In this example, the printer 1 is preferably provided with a drying unit and a heating unit (both not shown in the drawings). The drying unit and the heating unit are units for effectively drying the ink adhered to the recording medium 2 in an ink jet recording method described later. The drying unit and the heating unit may be provided at a position which permits drying and heating of the recording medium 2, and the installation position thereof is not particularly limited and may be independent from the printer 1. In order to efficiently dry the ink adhered to the recording medium 2, for example, in FIG. 1, the drying unit and the heating unit can be installed at a position facing the ink jet head 3.

Examples of the drying unit and the heating unit include a print heater mechanism that heats the recording medium 2 in contact with a heat source, a mechanism that irradiates infrared light, or a microwave which is an electromagnetic wave having a maximum wavelength of about 2,450 MHz or the like, a dryer mechanism that sprays hot air, and the like. The recording medium 2 is heated before, at the time or, or after the adhesion of the droplets ejected from the nozzles of the ink jet head 3 to the recording medium 2. The various conditions of heating, for example, the timing of heating, heating temperature, heating time, etc., are controlled by a control section.

In addition, the drying unit and the heating unit may be disposed downstream the recording medium 2 in the transport direction. In this case, the recording medium 2 is heated after the ink ejected from the nozzles N are adhered to the recording medium 2 to form an image. Consequently, the drying property of the ink adhered to the recording medium 2 is improved.

Further, in this example, the printer 1 may have a configuration, for example, provided with a pretreatment agent adhesion unit that treats the recording medium. An ink jet recording system may be used, in which the pretreatment agent adhesion unit is provided separately from the printer 1. Also, in this example, the pretreatment agent adhesion unit is not an essential component.

In this example, when the pretreatment agent adhesion unit is provided on the printer 1, and when ink jet coating is performed by ejecting the ink from the nozzles of the ink jet head which ejects the ink, the pretreatment agent composition can be uniformly adhered to the recording medium. When ink jet coating is applied to the pretreatment agent adhesion unit, a treatment solution can be contained in any one of the ink cartridges 7a, 7b, 7c, 7d, 7e, and 7f shown in FIG. 1. Other examples of the pretreatment agent adhesion unit include a dipping unit that dips the recording medium in the pretreatment agent composition, a roller that coats the pretreatment agent composition by using a roll coater or the like, a spray that sprays the pretreatment agent composition by using a spray device or the like, and the like.

1. 9. 2. Ink Jet Textile Printing

The white ink jet ink composition according to the present embodiment is preferably used for ink jet textile printing.

The "ink jet textile printing" represents recording (printing) the ink composition on the recording medium including a fabric by using an ink jet system and is a type of ink jet recording. Also, the "textile printing" represents recording (printing) the ink on the recording medium including a fabric, and is also referred to as "printing".

When the ink containing the hollow resin particles as a white coloring material is used, the hollow structure may be broken due to melting of the resin when the recording medium is heat-dried after printing, easily resulting in a decrease in color development. Therefore, a decrease in color development can be suppressed by using the hollow resin particles having a glass transition temperature equal to or higher than the specific temperature. However, even when such specific hollow resin particles are used, the hollow resin particles easily permeate into the recording medium, and thus color development may become insufficient. In particular, in ink jet textile printing in which printing is performed on a fabric, the color development easily deteriorates. On the other hand, the white ink jet ink composition according to the present embodiment has a configuration using the hollow resin particles having a glass transition temperature equal to or higher than the specific temperature and also has a configuration using the specific resin particles at a predetermined content or more. Therefore, the mesh sealing effect on a fabric can be obtained, and thus even in the use for ink jet textile printing, the color development and abrasion resistance can be improved.

2. Ink Jet Recording Method

An ink jet recording method according to an embodiment of the disclosure includes a white ink adhering step of ejecting the white ink jet ink composition described above from a recording head and adhering the ink composition to a recording medium.

The white ink jet ink composition used in the ink jet recording method according to the present embodiment uses the hollow resin particles as a coloring material, not a titanium oxide pigment being easily sedimented with time because of the high specific gravity, and thus sedimentation of the white coloring material can be satisfactorily suppressed, thereby causing excellent sedimentation property. On the other hand, when the hollow resin particles are used as the white coloring material in the ink, the hollow structure may be broken due to melting or the like of the resin when the recording medium is heat-dried after printing, and consequently the color development is easily decreased. Thus, a decrease in color development can be suppressed by using the hollow resin particles having a glass transition temperature equal to or higher than the specific temperature. However, even when the specific hollow resin particles are used, the hollow resin particles easily permeate into the recording medium, and thus color development may become insufficient.

On the other hand, the white ink jet ink composition used in the ink jet recording method according to the present embodiment has a configuration further using the specific resin particles at a predetermined content or more. This can cause the mesh sealing effect on the recording medium, that is, the effect of suppressing the hollow resin particles from permeating into the recording medium, and thus color development can be improved. As described above, the ink jet recording method according to the present embodiment uses the white ink jet ink composition, which contains the hollow resin particles having a glass transition temperature equal to or higher than the specific temperature, and the specific resin particles at a predetermined content or more, and thus both color development and sedimentation property can be improved.

Each of the steps of the ink jet recording method according to the present embodiment is described below.

2. 1. White Ink Adhering Step

In the white ink adhering step, the white ink jet ink composition described above is ejected from the recording head and adhered to the recording medium.

In this step, by using the printer 1 shown in FIG. 1, the white ink jet ink composition described above is ejected as droplets from the recording head and adhered to the recording medium, forming an image or the like.

The white ink adhering step may use a recording head having the circulation passages as shown in FIG. 2 and FIG. 3 as the recording head that ejects the ink or may use a recording head with a configuration not having the circulation passages.

In the white ink adhering step, the amount of the ink adhered to the recording medium is preferably 30 $mg/inch^2$ or more, more preferably 45 $mg/inch^2$ or more, still more preferably 60 $mg/inch^2$ or more, particularly preferably 75 $mg/inch^2$ or more, and specially preferably 90 $mg/inch^2$ or more. The upper limit of the amount of the ink adhered in the white ink adhering step is not particularly limited, but is preferably 150 $mg/inch^2$ or less, more preferably 135 $mg/inch^2$ or less, and still more preferably 120 $mg/inch^2$ or less. With the amount of the ink adhered within the range described above, the white ink composition is relatively much adhered to the recording medium, and thus color development may be improved. However, the much amount of the ink adhered easily causes insufficient drying of the ink and easily causes poor abrasion resistance. On the other hand, when in such a case, heating is performed at a high temperature for a long time in order to achieve good abrasion resistance, the hollow structure of the hollow resin particles is broken, thereby easily causing poor color development. However, even with the amount of the ink adhered within the range, the white ink jet ink composition used in the present embodiment can easily secure the excellent color development and good abrasion resistance.

The recording medium may be a medium having a liquid-absorbing surface or a medium not having a liquid-absorbing surface. Therefore, usable examples of the recording medium include, but are not particularly limited to, paper, a film, a fabric, a metal, glass, a polymer, and the like.

Examples of a material constituting a fabric include, but are not particularly limited to, natural fibers such as cotton, hemp, wool, silk, and the like; synthetic fibers such as polypropylene, polyester, acetate, triacetate, polyamide, polyurethane, and the like; biodegradable fibers such as polylactic acid and the like; and the like, and a blend of these fibers may be used.

Examples of the form of a fabric include a cloth, clothing, other accessories, and the like. The cloth includes a woven fabric, a knitted fabric, and a nonwoven fabric. The clothing and other accessories include articles after sewing, such as a T-shirt, a handkerchief, a scarf, a towel, a handbag, a fabric bag, a curtain, sheets, a bedcover, and furniture such as wallpaper, and articles before sewing, such as cloth before and after cutting and the like. Examples of these forms include a long-shaped form wound in a roll shape, a form cut into a predetermined size, a product form, and the like.

The METSUKE of the fabric is not particularly limited, but may be 1.0 oz or more and 10.0 oz or less, and is preferably 2.0 oz or more and 9.0 oz or less, more preferably 3.0 oz or more and 8.0 oz or less, and still more preferably 4.0 oz or more and 7.0 oz or less. When the METSUKE of the fabric is within the range described above, good recording can be performed. Further, the ink jet recording method according to the present embodiment can be applied to plural types of fabrics having different METSUKE amounts, and good printing can be performed.

A cotton fabric previously colored with a dye may be used as the fabric. Examples of the dye used for coloring a fabric include water-soluble dyes such as an acid dye, a basic dye, and the like; a disperse dye used in combination with a dispersant; a reactive dye, and the like. When a cotton fabric is used as the fabric, a reactive dye suitable for dyeing cotton is preferably used.

Among these recording media, a fabric is preferred as the recording medium, and a fabric treated with a cationic compound is preferred. In recording on a fabric by using the ink containing the hollow resin particles, sufficient color development may be hardly obtained even with the fabric treated with a component which aggregates the ink because the hollow resin particles easily permeate into the fabric. However, the ink jet recording method according to the present embodiment uses the white ink jet ink composition described above, and thus excellent color development can be obtained.

Cationic Compound Treatment

A method for treating the fabric with the cationic compound is not particularly limited, but the fabric can be treated with the cationic compound by coating the fabric with a pretreatment agent containing the cationic compound and then drying the fabric.

Pretreatment Agent

When the pretreatment agent is used, the cationic compound may be contained. The pretreatment agent may contain the resin particles, the organic solvent, water, etc., which can be contained in the white ink jet ink composition described above. The pretreatment agent contains, for example, the cationic compound, the resin particles, and water.

The cationic compound has the function of aggregating the components in the ink composition. Therefore, when the ink composition is adhered to the fabric to which the pretreatment agent has been adhered, the cationic compound promotes aggregation of the ink particles and increases the viscosity of the ink, thereby suppressing absorption to the gaps or the inside of the fibers constituting the fabric. Thus, the cationic compound holds the ink on the surface of the fabric, thereby improving the color development of the ink in a recorded matter. Also, blurring and bleeding are suppressed.

Examples of the cationic compound include polyvalent metal salts such as calcium salt, magnesium salt, and the like; cationic resins such as a cationic urethane resin; an olefinic resin; an allylamine-based resin, and the like; a cationic surfactant; an inorganic or organic acid; and the like. Among these, in view of improvement in color development and suitability for a cotton fabric, a polyvalent metal salt is preferably used. These cationic compounds may be used alone or in combination of two or more.

The content of the cationic compound contained in the pretreatment agent is not particularly limited, but the content relative to the total mass of the pretreatment agent is preferably 0.1% by mass or more, more preferably 2.0% by mass or more, and still more preferably 5.0% by mass or more. Also, the content of the cationic compound contained in the pretreatment agent relative to the total mass of the pretreatment agent is preferably 40.0% by mass or less, more preferably 25.0% by mass or less, and still more preferably 10.0% by mass or less.

Coating Method

A coating method is not particularly limited as long as the pretreatment agent can be adhered to the region in at least a portion of the fabric. Examples of the coating method include dip coating by dipping the fabric in the pretreatment agent, roller coating by adhering the pretreatment agent using a brush, a roller, a spatula, a roll coater, or the like, spray coating by spraying the pretreatment agent using a spray device or the like, ink jet coating by adhering the pretreatment agent by an ink jet method, and the like. Among these, dip coating, roller coating, spray coating, and the like are preferably used because of the simple configuration of an apparatus and the ability to rapidly adhere the pretreatment agent.

The amount of the pretreatment agent coated is not particularly limited, but when the fabric is used as the recording medium, the coating amount per A4-size area is preferably 5 to 30 g, more preferably 10 to 25 g, and still more preferably 15 to 25 g.

Drying Method

A drying method is not particularly limited, but for example, drying by a hot press device, an oven, or the like can be used. The heating temperature is preferably 100° C. or more, more preferably 110° C. to 200° C., and still more preferably 120° C. to 180° C. In addition, the heating time is preferably within 2 minutes. The heating temperature of 100° C. or more tends to improve the fixability of the cationic compound. The pressure of pressing using the hot press device is not particularly limited, but is preferably about 3.0 to 5.0 $N/cm^2$.

2. 2. Heat Drying Step

The ink jet recording method according to the present embodiment may include a step of heat-drying the ink adhered to the recording medium after the white ink adhering step.

Examples of the heat drying method include, but are not particularly limited to, a heat press method, a normal pressure steam method, a high-pressure steam method, a thermofixing method, and the like. A heat source in heat drying is not particularly limited, but for example, an ultraviolet lamp or the like can be used.

The heat drying temperature is preferably a temperature at which the resin particles of the ink are fused, and the medium such as water or the like is evaporated. For example, the temperature is preferably about 100° C. or more and about 200° C. or less, more preferably 170° C. or less, and still more preferably 150° C. or less. The dry heating temperature in the dry heating step represents the surface temperature of the image or the like formed on the recording medium. The time to perform heat drying is not particularly limited but is, for example, preferably 30 seconds or more and 20 minutes or less and more preferably 5 minutes or more and 10 minutes or less.

2. 3. Other Step

The ink jet recording method according to the present embodiment may include, after the heat drying step, a step of water-washing the printed recording medium and a step of again heat drying the recording medium. In water-washing, if required, the component such as the ink or the like, which has not been adhered to the recording medium, may be washed off by soaping treatment using a heat soap solution or the like.

3. Examples

The present disclosure is described in further detail below by examples and comparative examples, but the present disclosure is not limited to these examples. Hereinafter, "%" is on mass basis unless otherwise specific.

3. 1. Preparation of White Ink Jet Ink Composition

Components were mixed at the contents shown in Table 1 below to Table 3 below, stirred at room temperature for 2 hours, and then filtered with a membrane filter having a pore diameter of 5 μm, thereby preparing each white ink jet ink composition. The unit of contents in each of the ink compositions shown in Table 1 below to Table 3 below is % by mass, and water was added so that the total mass of the ink was 100% by mass. Also, each of the ink compositions is represented by a solid content concentration, the pigment fine particles are represented by a pigment concentration, and the resin fine particles are represented by a solid content concentration.

In addition, hollow resin dispersions C and D of pigment fine particles were produced as follows.

Production Example of Hollow Resin Dispersion C
Synthesis of Seed Particle Emulsion In a four-neck separable flask provided with a stiffer, a thermometer, a condenser, and a dropping funnel, 726.0 parts by mass of deionized water, 5.0 parts by mass of methyl methacrylate, and 0.1 parts by mass of methacrylic acid were charged and heated under stirring. Next, when the inner temperature of the separable flask was 70° C., 1.0 parts by mass of a 10 mass % aqueous ammonium persulfate solution was added and heated at 80° C. for 20 minutes.

On the other hand, 141.0 parts by mass of methyl methacrylate, 94.9 parts by mass of methacrylic acid, 5.0 parts by mass of sodium alkylbenzene sulfonate (Neogen SF-20, manufactured by Dai-Ich Kogyo Seiyaku Co., Ltd.) serving as an anionic emulsifier, and 120.0 parts by mass of deionized water were emulsified by using Homodisper to prepare a pre-emulsion, which was then poured into a dropping funnel.

Next, the pre-emulsion prepared as described above was uniformly added dropwise over 3 hours while the inner temperature of the separable flask was maintained at 80° C., and at the same time, 10.0 parts by mass of a 10 mass % aqueous ammonium persulfate solution was uniformly added dropwise over 3 hours. After the completion of addition, the resultant mixture was matured at 80° C. for 3 hours, cooled, and then filtered with a 120-mesh filter cloth, producing a seed particle emulsion.

First-Stage Polymerization

In a four-neck separable flask provided with a stiffer, a thermometer, a condenser, and a dropping funnel, 188.2 parts by mass of deionized water was charged, and 66.0 parts by mass of the feed particle emulsion prepared as described above was added dropwise and heated to 80° C. under stirring. On the other hand, 2.4 parts by mass of butyl acrylate, 1.1 parts by mass of butyl methacrylate, 19.5 parts by mass of methyl methacrylate, 0.7 parts by mass of methacrylic acid, 5.0 parts by mass of sodium alkylbenzene sulfonate (Neogen SF-20, manufactured by Dai-Ich Kogyo Seiyaku Co., Ltd.), and 55.3 parts by mass of deionized water were emulsified by using Homodisper to prepare a pre-emulsion 1, which was then poured into the dropping funnel.

Next, the pre-emulsion 1 prepared as described above was uniformly added dropwise over 30 minutes while the inner temperature of the separable flask was maintained at 80° C., and at the same time, 1.2 parts by mass of a 10 mass % aqueous sodium persulfate solution was uniformly added dropwise over 30 minutes.

Second-Stage Polymerization

Then, 60.1 parts by mass of styrene, 0.5 parts by mass of 1,3-diethylbenzene, 5.0 parts by mass of sodium alkylbenzene sulfonate (Neogen SF-20, manufactured by Dai-Ich Kogyo Seiyaku Co., Ltd.), and 51.8 parts by mass of deionized water were emulsified in Homodisper to prepare a pre-emulsion 2, which was then poured into the dropping funnel.

Next, 1 hour after the completion of addition of the pre-emulsion 1, the pre-emulsion 2 prepared as described above was uniformly added dropwise over 60 minutes while the inner temperature of the separable flask was maintained at 80° C., and at the same time, 3.5 parts by mass of a 10 mass % aqueous sodium persulfate solution was uniformly added dropwise over 60 minutes.

After the completion of addition of the pre-emulsion 2, 7.5 parts by mass of 28 mass % ammonia water was added dropwise in order to swell and dissolve the seed particles, and then matured at 80° C. for 1 hour. The mixture was cooled and then filtered with a 120-mesh filter cloth, producing hollow resin dispersion C.

Production Example of Hollow Resin Dispersion D

A hollow resin dispersion D was produced by the same method as in the production example of the hollow resin dispersion C except that in the production example of the hollow resin dispersion C, 20.5 parts by mass of styrene was added in second-stage polymerization.

Inorganic Particle Dispersion

Also, a commercial product below was used as an inorganic particle dispersion.

Titanium dioxide slurry: Nanotek® Slurry (trade name, manufactured by C. I. Kasei Co., Ltd., titanium dioxide solid content: 20% by mass, average particle diameter: 250 nm)

3. 2. Preparation of Pretreatment Agent

Components were mixed at each of the contents shown in Table 4 below, stirred at room temperature for 2 hours, and then filtered with a membrane filter having a pore diameter of 5 μm, preparing each pretreatment agent. The unit of the contents of the pretreatment agent compositions shown in Table 4 below is "% by mass", and water was added so that the total mass of the pretreatment agent was 100% by mass. The pretreatment agent compositions are represented by solid content concentration.

TABLE 1

| | | | | Example 1 | Example 2 | Example 3 | Example 4 |
|---|---|---|---|---|---|---|---|
| White ink composition | Pigment fine particle | Hollow resin dispersion | ROPAQUE HT1432 | 10.0 | 10.0 | | 10.0 |
| | | | SX868B | | | | |
| | | | Dispersion C | | | | |
| | | | Dispersion D | | | 10.0 | |
| | | Inorganic particle dispersion | Titanium dioxide slurry | | | | |

TABLE 1-continued

|  |  |  |  | | | | |
|---|---|---|---|---|---|---|---|
|  | Resin fine particle | Styrene-acrylic resin dispersion | Movinyl 966A | 9.0 | 5.0 | 9.0 | 9.0 |
|  |  | Urethane resin dispersion | Bontiter HUX-380 |  |  |  |  |
|  | Polyhydric alcoho | High boiling point (270° C. or more) | Glycerin Triethylene glycol | 21.0 | 21.0 | 21.0 | 13.0 |
|  |  | Medium boiling point (less than 270° C.) | 3-Methyl-1,3-butanediol 1,3-Butanediol | 3.0 | 8.0 | 3.0 | 12.0 |
|  | Other | Monohydric alcohol | Triethylene glycol monobutyl ether | 1.0 | 1.0 | 1.0 | 1.0 |
|  |  | Alkali | Triethanolamine | 0.5 | 0.5 | 0.5 | 0.5 |
|  |  | Surfactant | BYK348 | 0.3 | 0.3 | 0.3 | 0.3 |
|  |  | Crosslinking agent | NBP-211 Epocros K2010E |  |  |  |  |
|  |  | Wax | Hitech E-9015 Hitech E-8237 |  |  |  |  |
|  |  | Water |  | Balance | Balance | Balance | Balance |
| Pretreatment agent composition |  |  |  | Pre-1 | Pre-1 | Pre-1 | Pre-1 |
| Presence of circulation structure of printing head |  |  |  | No | No | No | No |
| Coating amount of white ink mg/inch$^2$ |  |  |  | 100 | 100 | 100 | 100 |
| Whiteness |  |  |  | A | A− | A− | A |
| Sedimentation property |  |  |  | A | A | A | A |
| Abrasion resistance |  |  |  | A− | A− | A | A |
| Ejection reliability |  |  |  | A | A | A | A |

|  |  |  |  | Example 5 | Example 6 | Example 7 | Example 8 |
|---|---|---|---|---|---|---|---|
| White ink composition | Pigment fine particle | Hollow resin dispersion | ROPAQUE HT1432 SX868B | 10.0 | 10.0 |  | 10.0 |
|  |  |  | Dispersion C |  |  | 10.0 |  |
|  |  |  | Dispersion D |  |  |  |  |
|  |  | Inorganic particle dispersion | Titanium dioxide slurry |  |  |  |  |
|  | Resin fine particle | Styrene-acrylic resin dispersion | Movinyl 966A | 9.0 |  | 9.0 | 9.0 |
|  |  | Urethane resin dispersion | Bontiter HUX-380 |  | 9.0 |  |  |
|  | Polyhydric alcoho | High boiling point (270° C. or more) | Glycerin Triethylene glycol |  | 13.0 | 13.0 | 13.0 |
|  |  | Medium boiling point (less than 270° C.) | 3-Methyl-1,3-butanediol 1,3-Butanediol | 24.0 | 12.0 | 13.0 | 10.5 |
|  | Other | Monohydric alcohol | Triethylene glycol monobutyl ether | 1.0 | 1.0 | 1.0 | 1.0 |
|  |  | Alkali | Triethanolamine | 0.5 | 0.5 | 0.5 | 0.5 |
|  |  | Surfactant | BYK348 | 0.3 | 0.3 | 0.3 | 0.3 |
|  |  | Crosslinking agent | NBP-211 Epocros K2010E |  |  |  |  |
|  |  | Wax | Hitech E-9015 Hitech E-8237 |  |  |  | 1.0 |
|  |  | Water |  | Balance | Balance | Balance | Balance |
| Pretreatment agent composition |  |  |  | Pre-1 | Pre-1 | Pre-1 | Pre-1 |
| Presence of circulation structure of printing head |  |  |  | No | No | No | No |
| Coating amount of white ink mg/inch$^2$ |  |  |  | 100 | 100 | 100 | 100 |
| Whiteness |  |  |  | A | A | S | A |
| Sedimentation property |  |  |  | A | A | A | A |
| Abrasion resistance |  |  |  | A | A− | A | A |
| Ejection reliability |  |  |  | B | A | A | A |

TABLE 2

|  |  |  |  | Example 9 | Example 10 | Example 11 | Example 12 |
|---|---|---|---|---|---|---|---|
| White ink composition | Pigment fine particle | Hollow resin dispersion | ROPAQUE HT1432 SX868B Dispersion C Dispersion D | 10.0 | 10.0 | 10.0 | 10.0 |
|  |  | Inorganic particle dispersion | Titanium dioxide slurry |  |  |  |  |
|  | Resin fine particle | Styrene-acrylic resin dispersion | Movinyl 966A | 9.0 | 9.0 | 9.0 | 9.0 |
|  |  | Urethane resin dispersion | Bontiter HUX-380 |  |  |  |  |

TABLE 2-continued

| | | | | | | | |
|---|---|---|---|---|---|---|---|
| | Polyhydric alcohol | High boiling point (270° C. or more) | Glycerin Triethylene glycol | 13.0 | 13.0 | 13.0 | 13.0 |
| | | Medium boiling point (less than 270° C.) | 3-Methyl-1,3-butanediol 1,3-Butanediol | 10.5 | 10.5 | 10.5 | 12.0 |
| | Other | Monohydric alcohol | Triethylene glycol monobutyl ether | 1.0 | 1.0 | 1.0 | 1.0 |
| | | Alkali | Triethanolamine | 0.5 | 0.5 | 0.5 | 0.5 |
| | | Surfactant | BYK348 | 0.3 | 0.3 | 0.3 | 0.3 |
| | | Crosslinking agent | NBP-211 | | 1.0 | | |
| | | | Epocros K2010E | | | 1.0 | |
| | | Wax | Hitech E-9015 | | | | |
| | | | Hitech E-8237 | 1.0 | | | |
| | | Water | | Balance | Balance | Balance | Balance |
| Pretreatment agent composition | | | | Pre-1 | Pre-1 | Pre-1 | Pre-1 |
| Presence of circulation structure of printing head | | | | No | No | No | Yes |
| Coating amount of white ink mg/inch² | | | | 100 | 100 | 100 | 100 |
| Whiteness | | | | A | A | A | A |
| Sedimentation property | | | | A | A | A | A |
| Abrasion resistance | | | | S | A | S | A |
| Ejection reliability | | | | A | A | A | S |

| | | | | Example 13 | Example 14 | Example 15 | Example 16 |
|---|---|---|---|---|---|---|---|
| White ink composition | Pigment fine particle | Hollow resin dispersion | ROPAQUE HT1432 | | 10.0 | 8.0 | 15.0 |
| | | | SX868B | | | | |
| | | | Dispersion C | 13.0 | | | |
| | | | Dispersion D | | | | |
| | | Inorganic particle dispersion | Titanium dioxide slurry | | | | |
| | Resin fine particle | Styrene-acrylic resin dispersion | Movinyl 966A | 9.0 | 9.0 | 9.0 | 9.0 |
| | | Urethane resin dispersion | Bontiter HUX-380 | | | | |
| | Polyhydric alcohol | High boiling point (270° C. or more) | Glycerin Triethylene glycol | 10.0 | 13.0 | 13.0 | 13.0 |
| | | Medium boiling point (less than 270° C.) | 3-Methyl-1,3-butanediol 1,3-Butanediol | 11.0 | 12.0 | 14.5 | 5.0 |
| | Other | Monohydric alcohol | Triethylene glycol monobutyl ether | 1.0 | 1.0 | 1.0 | 1.0 |
| | | Alkali | Triethanolamine | 0.5 | 0.5 | 0.5 | 0.5 |
| | | Surfactant | BYK348 | 0.3 | 0.3 | 0.3 | 0.3 |
| | | Crosslinking agent | NBP-211 | | | | |
| | | | Epocros K2010E | | | | |
| | | Wax | Hitech E-9015 | | | | |
| | | | Hitech E-8237 | | | | |
| | | Water | | Balance | Balance | Balance | Balance |
| Pretreatment agent composition | | | | Pre-1 | Pre-2 | Pre-1 | Pre-1 |
| Presence of circulation structure of printing head | | | | No | No | No | No |
| Coating amount of white ink mg/inch² | | | | 50 | 100 | 100 | 100 |
| Whiteness | | | | A− | A | A− | S |
| Sedimentation property | | | | A | A | A | A |
| Abrasion resistance | | | | A | A− | A | A |
| Ejection reliability | | | | A | A | A | B |

TABLE 3

| | | | | Example 17 | Example 18 | Example 19 | Comparative Example 1 |
|---|---|---|---|---|---|---|---|
| White ink composition | Pigment fine particle | Hollow resin dispersion | ROPAQUE HT1432 | 10.0 | 10.0 | 10.0 | |
| | | | SX868B | | | | 10.0 |
| | | | Dispersion C | | | | |
| | | | Dispersion D | | | | |
| | | Inorganic particle dispersion | Titanium dioxide slurry | | | | |
| | Resin fine particle | Styrene-acrylic resin dispersion | Movinyl 966A | 12.0 | 9.0 | 9.0 | 9.0 |
| | | Urethane resin dispersion | Bontiter HUX-380 | | | | |
| | Polyhydric alcohol | High boiling point (270° C. or more) | Glycerin Triethylene glycol | 13.0 | 13.0 | 13.0 | 21.0 |
| | | Medium boiling point (less than 270° C.) | 3-Methyl-1,3-butanediol 1,3-Butanediol | 8.5 | 12.0 | 12.0 | 3.0 |
| | Other | Monovalent alcohol | Triethylene glycol monobutyl ether | 1.0 | 1.0 | 1.0 | 1.0 |
| | | Alkali | Triethanolamine | 0.5 | 0.5 | 0.5 | 0.5 |
| | | Surfactant | BYK348 | 0.3 | 0.3 | 0.3 | 0.3 |
| | | Crosslinking agent | NBP-211 | | | | |
| | | | Epocros K2010E | | | | |

TABLE 3-continued

|  |  |  |  |  |  |
|---|---|---|---|---|---|
| Wax |  | Hitech E-9015 |  |  |  |
|  |  | Hitech E-8237 |  |  |  |

|  |  |  |  |
|---|---|---|---|
| Water | Balance | Balance | Balance | Balance |
| Pretreatment agent composition | Pre-1 | Pre-1 | Pre-1 | Pre-1 |
| Presence of circulation structure of printing head | No | No | No | No |
| Coating amount of white ink mg/inch² | 100 | 100 | 100 | 100 |
| Whiteness | A | A | A | B |
| Sedimentation property | A | A | A | A |
| Abrasion resistance | S | A | A | A |
| Ejection reliability | B | A | A | A |

|  |  |  |  | Comparative Example 2 | Comparative Example 3 | Comparative Example 4 |
|---|---|---|---|---|---|---|
| White ink composition | Pigment fine particle | Hollow resin dispersion | ROPAQUE HT1432 | 10.0 | | |
| | | | SX868B | | 20.0 | |
| | | | Dispersion C | | | |
| | | | Dispersion D | | | |
| | | Inorganic particle dispersion | Titanium dioxide slurry | | | 10.0 |
| | Resin fine particle | Styrene-acrylic resin dispersion | Movinyl 966A | 2.0 | | 9.0 |
| | | Urethane resin dispersion | Bontiter HUX-380 | | | |
| | Polyhydric alcohol | High boiling point (270° C. or more) | Glycerin | 21.0 | 21.0 | 21.0 |
| | | | Triethylene glycol | | | |
| | | Medium boiling point (less than 270° C.) | 3-Methyl-1,3-butanediol | 13.0 | 3.0 | 3.0 |
| | | | 1,3-Butanediol | | | |
| | Other | Monovalent alcohol | Triethylene glycol monobutyl ether | 1.0 | 1.0 | 1.0 |
| | | Alkali | Triethanolamine | 0.5 | 0.5 | 0.5 |
| | | Surfactant | BYK348 | 0.3 | 0.3 | 0.3 |
| | | Crosslinking agent | NBP-211 | | | |
| | | | Epocros K2010E | | | |
| | Wax | | Hitech E-9015 | | | |
| | | | Hitech E-8237 | | | |
| | Water | | | Balance | Balance | Balance |
| Pretreatment agent composition | | | | Pre-1 | Pre-1 | Pre-1 |
| Presence of circulation structure of printing head | | | | No | No | No |
| Coating amount of white ink mg/inch² | | | | 100 | 100 | 100 |
| Whiteness | | | | B | B | S |
| Sedimentation property | | | | A | A | B |
| Abrasion resistance | | | | B | B | A– |
| Ejection reliability | | | | A | A | B |

TABLE 4

|  |  |  |  | Pre-1 | Pre-2 |
|---|---|---|---|---|---|
| Pretreatment agent composition | Aggregating agent | Calcium nitrate heptahydrate | | 20.0 | 20.0 |
| | Fixing agent | Styrene-acrylic resin dispersion | Movinyl 966A | 2.0 | — |
| | | Water-soluble resin | Unisence 104L | — | 2.0 |
| | Other | Water | | Balance | Balance |

Additional description is given of each of the components shown in Table 1 above to Table 4 above.

White Ink Jet Ink Composition

Pigment Fine Particles

ROPAQUE HT1432 (trade name manufactured by Dow Chemical Company, styrene-acrylic resin, Tg: 123° C., particle diameter: 500 nm)

SX868B (trade name manufactured by JSR Corporation, styrene-acrylic resin, Tg: 109° C., particle diameter: 500 nm)

Dispersion C (produced in the production example of the hollow resin dispersion C described above, styrene-acrylic resin, Tg: 131° C., particle diameter: 700 nm)

Dispersion D (produced in the production example of the hollow resin dispersion D described above, styrene-acrylic resin, Tg: 124° C., particle diameter: 280 nm)

Resin Fine Particles

Movinyl 966A (trade name manufactured by Nippon Synthetic Chemical Industry Co., Ltd., solid content: 45% by mass, Tg: −32° C.)

Bontiter HUX-380 (trade name manufactured by ADEKA Corporation, Tg: −5° C. to −35° C.)

Surfactant

BYK 348 (trade name manufactured by BYK Chemie Japan K. K., silicone-based surfactant)

Crosslinking Agent

NBP-211 (trade name manufactured by Meisei Chemical Works, Ltd., solid content: 40% by mass, blocked isocyanate-based crosslinking agent, reaction temperature: 150° C. or more)

Epocros K2010E (trade name manufactured by Nippon Shokubai Co., Ltd., oxazoline-based crosslinking agent, reaction temperature: 80° C. to 100° C.)

Wax

Hitech E-9015 (trade name manufactured by Toho Chemical Industry Co., Ltd., polyolefin wax, melting point: 137° C.)

Hitech E-8237 (trade name manufactured by Toho Chemical Industry Co., Ltd., polyolefin wax, melting point: 106° C.)

Pretreatment Agent

Fixing Agent

Movinyl 966A (trade name manufactured by Nippon Synthetic Chemical Industry Co., Ltd., solid content: 45% by mass, Tg: −32° C.)

Unisence 104L (trade name manufactured by Senka Corporation, dimethylamine-epichlorohydrin condensate)

3. 3. Recording Method

The pretreatment agent of each of the examples and comparative examples prepared as described above was coated by a spray on a T-shirt (black, 100% cotton) manufactured by Hanes Inc. used as a fabric to be treated so that the amount was 15 to 20 g per A4 size, dried at 130° C. for 1 minute by a heat press machine (AF-54TEN, manufactured by Itsumi Co., Ltd.) so that the press pressure was 4.2 N/cm$^2$, and then returned to 25° C., forming a pretreated fabric.

An ink jet apparatus not having an ink circulating mechanism in a head and an ink jet apparatus having an ink circulation mechanism in a head (both modified machines of SC-F2000 manufactured by Seiko Epson Corporation) were prepared as a recording apparatus. The white ink jet ink composition of each of the examples and comparative examples produced as described above was filled in the recording apparatus, and an image described in each of the evaluation methods was printed on the pretreatment fabric described above.

3. 4. Evaluation Method

In each of the examples and comparative examples, the methods for evaluating whiteness, sedimentation property, abrasion resistance, and ejection reliability are as follows.

3. 4. 1. Whiteness

The white ink composition sufficiently stirred to recover sedimentation was coated by ink jet on the fabric, pretreated by the method described above, so that the ink adhesion amount was as described in Table 1 to Table 3 above, and then heat-dried at 150° C. for 5 minutes by using a conveyor drying furnace (manufactured by M & R Inc., Economax_D conveyor drying furnace). Then, the printed fabric was immersed in 2 L of water at a water temperature of 25° C. and washed for 5 minutes by shaking a vessel at a frequency of 1 time/2 sec. Then, water was removed by a towel, and the printed fabric was heat-dried at 150° C. for 5 minutes. Then, L* was measured by using a colorimeter (manufactured by Gretag Ltd., Spectrolino) and determined according to the following determination criteria.

Determination Criteria
S: 85≤L*
A: 70≤L*<85
60≤L*<70
B: L*<60

3. 4. 2. Sedimentation Property

First, 100 mL of the white ink composition of each of the examples, which was sufficiently stirred to recover sedimentation, was poured into a glass-made screw tube bottle (manufactured by AS ONE Corporation, LABORAN Screw Tube Bottle No. 8), and 5 mL of the ink was collected at a depth of 10 mm from the ink liquid surface by using a pipette, preparing a sample before a test. Then, the screw tube bottle was allowed to stand in an environment of 20° C., and 168 hr after, 5 mL of the ink was again collected at a depth of 10 mm from the ink surface to prepare a sample after a test. Each of the samples before and after the test was sufficiently stirred to recover sedimentation, and then 0.5 mg of each of the samples was collected by using a pipette and diluted with pure water by using a 1 L measuring flask to prepare 1 L of a diluted solution. Then, an absorbance was (Abs) was measured by using ultraviolet-visible spectrophotometer (trade name "V-770 series" manufactured by JASCO Corporation. Then, the percentage of absorbance change was calculated according to a formula below and determined according to the following determination criteria.

Percentage of absorbance change:{(Abs after test)−(Abs before test)}/(Abs before test)×100

Determination Criteria
A: −5% or more
B: Less than −5%

3. 4. 3. Abrasion Resistance

The white ink composition of each of the examples was ejected to one of the surfaces of the pretreated fabric as a material to be treated by using the recording apparatus so that the coating density was as described in each of the examples, thereby printing a 20-cm square solid image. Then, the fabric was heat-dried at 150° C. for 10 minutes by using a conveyor drying furnace (manufactured by M & R Inc., Economax_D conveyor drying furnace), and then returned to 25° C., producing a textile printing product.

Next, the image of the textile printing product was rubbed 20 times with a white cotton fabric at a load of 200 g by using a Gakushin-type rubbing fastness tester (AB-301S manufactured by Tester Sangyo Co., Ltd.). Then, the image of the textile printing product after rubbing was visually observed, and the ratio obtained by dividing the area of the region where the ink was peeled from the fabric by the area of the region rubbed was determined according to the following criteria.

S: No peeling
A: Peeled points were less than 30%.
A−: Peeled points were 30% or more and less than 70%.
B: Peeled points were 70% or more.

3. 4. 4. Ejection Reliability

The white ink composition of each of the examples was filled in a color ink cartridge of the recording apparatus, and a nozzle check image was printed on a transparent PET film by using a built-in nozzle check function of SC-F2000. After it was confirmed that the nozzle check image was normally printed and the ink was normally ejected from all nozzles, the nozzle check image was allowed to stand for 15 minutes in an environment at a room temperature of 25° C. and a relative humidity of 40% in a state where an automatic head cleaning function was set to OFF, and a drying prevention cap was not put on the head nozzles. During this time, the circulation operation in the recording apparatus having a circulation flow passage was performed. Further, the image was further allowed to stand for 24 hr in a state where the drying prevention cap was set. Then, the nozzle check image was again printed, and the number of nozzles not forming the nozzle check image was calculated and determined according to the following determination criteria.

When nozzle omission was observed, a recovery operation was performed one time by using the built-in head cleaning function of SC-F2000, and the nozzle check image was printed. Then, the number of nozzle omissions was measured and determined according to the following determination criteria.

S: No nozzle omission was observed.
A: Nozzle omission was observed, but nozzle omission was not observed after the recovery operation.
B: Nozzle omission was observed, and nozzle omission was also observed after the recovery operation.

3. 5. Evaluation Results

Table 1 to Table 3 above show the evaluation results of each of the examples and the comparative examples.

In any one of the examples containing the hollow resin particles having a glass transition temperature equal to or higher than the predetermined temperature and the specific resin particles in a predetermined amount or more, excellent color development (whiteness) and sedimentation property are exhibited. Also, any one of the examples shows excellent abrasion resistance.

On the other hand, in each of the comparative examples, both the color development (whiteness) and sedimentation property could not be improved. More specifically, Comparative Example 1 does not contain the hollow resin particles having a glass transition temperature equal to or higher than the predetermined temperature and thus shows poor color development (whiteness). Comparative Example 2 does not contain the specific resin particles in a predetermined amount or more and thus shows poor color development (whiteness). Comparative Example 3 does not contain the specific resin particles and thus shows poor color development (whiteness). Comparative Example 4 uses titanium dioxide in place of the hollow resin particles and thus shows poor sedimentation property.

The contents described below are derived from the embodiments described above.

According to an aspect, a white ink jet ink composition includes hollow resin particles, resin particles, and water. The hollow resin particles have a glass transition temperature of 120° C. or more, the resin particles are composed of an acrylic resin or a urethane resin, and the content of the resin particles is 5% by mass or more relative to the total mass of the ink composition.

According to an aspect, the white ink jet ink composition according to the aspect described above may further include 15% by mass or less of a polyhydric alcohol having a standard boiling point of 270° C. or more as a water-soluble organic solvent.

The white ink jet ink composition according to any one of the aspects described above may further include 5% by mass or more of a polyhydric alcohol having a standard boiling point of 150° C. or more and less than 270° C. as a water-soluble organic solvent.

In the white ink jet ink compositions according to any one of the aspects described above, the hollow resin particles may contain an acrylic resin.

In the white ink jet ink compositions according to any one of the aspects described above, the resin particles may be composed of an acrylic resin.

In the white ink jet ink compositions according to any one of the aspects described above, the particle diameter of the hollow resin particles may be 400 to 1000 nm.

The white ink jet ink compositions according to any one the aspects described above may further include a lubricant having a melting point of 130° C. or less.

The white ink jet ink compositions according to any one the aspects described above may further include a crosslinking agent having a reaction temperature of 130° C. or less.

The white ink jet ink compositions according to any one of the aspects described above may be applied to a recording apparatus provided with a recording head having a circulation passage.

The white ink jet ink compositions according to any one of the aspects described above may be used for ink jet textile printing.

According to an aspect, an ink jet recording method includes a white ink adhering step of ejecting the white ink jet ink compositions according to the aspect described above from a recording head and adhering the ink composition to a recording medium.

In the ink jet recording method according to an aspect, the recording medium may be a fabric, and the fabric may be treated with a cationic compound.

In the ink jet recording methods according to any one of the aspects described above, the coating amount of the ink in the white ink adhering step may be 30 mg/inch$^2$ or more.

The present disclosure is not limited to the embodiments described above, and various modifications can be made. For example, the present disclosure includes substantially the same configuration as that described in the embodiments, for example, a configuration having the same function, method, and results, or a configuration having the same object and effect. The present disclosure also includes a configuration in which a portion not essential in the configuration described in the embodiment is replaced. Further, the present disclosure includes a configuration which can exhibit the same operational effect or achieve the same object as in the configuration described in the embodiment. Further, the present disclosure includes a configuration in which a known technology is added to the configuration described in the embodiment.

What is claimed is:

1. A white ink jet ink composition comprising:
   hollow resin particles;
   resin particles;
   a crosslinking agent having a reaction temperature of 130° C. or less; and
   water,
   wherein the hollow resin particles have a glass transition temperature of 150° C. or more;
   the resin particles are composed of an acrylic resin or a urethane resin;
   the crosslinking agent is present in the white ink jet ink composition in an amount that ranges between 0.1 to 10% by mass relative to a total mass of the white ink jet ink composition; and
   a content of the resin particles is 5% by mass or more relative to a total mass of the white ink jet ink composition.

2. The white ink jet ink composition according to claim 1 further comprising 15% by mass or less of a polyhydric alcohol having a standard boiling point of 270° C. or more as a water-soluble organic solvent.

3. The white ink jet ink composition according to claim 1 further comprising 5% by mass or more of a polyhydric alcohol having a standard boiling point of 150° C. or more and less than 270° C. as a water-soluble organic solvent.

4. The white ink jet ink composition according to claim 1, wherein the hollow resin particles contain an acrylic resin.

5. The white ink jet ink composition according to claim 1, wherein the resin particles are composed of an acrylic resin.

6. The white ink jet ink composition according to claim 1, wherein the particle diameter of the hollow resin particles is 400 to 1000 nm.

7. The white ink jet ink composition according to claim 1 further comprising a lubricant having a melting point of 130° C. or less.

8. The white ink jet ink composition according to claim 1, wherein the white ink jet ink composition is applied to a recording apparatus provided with a recording head having a circulation passage.

9. The white ink jet ink compositions according to claim 1, wherein the white ink jet ink composition is used for ink jet textile printing.

10. An ink jet recording method comprising:
    a white ink adhering step of ejecting the white ink jet ink compositions according to claim 1 from a recording head and adhering the white ink jet ink composition to a recording medium.

11. The ink jet recording method according to claim 10, wherein the recording medium is a fabric, and the fabric is treated with a cationic compound.

12. The ink jet recording method according to claim 10, wherein an amount of the white ink jet ink adhered to the recording medium in the white ink adhering step is 30 mg/inch$^2$ or more.

* * * * *